(12) United States Patent
Ichikawa et al.

(10) Patent No.: US 6,426,812 B2
(45) Date of Patent: *Jul. 30, 2002

(54) HOLOGRAM COLOR FILTER, AND ITS FABRICATION METHOD

(75) Inventors: Nobuhiko Ichikawa; Tsuyoshi Hotta; Kenji Ueda, all of Tokyo (JP)

(73) Assignee: Dai Nippon Printing Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,511

(22) Filed: Sep. 14, 1998

Related U.S. Application Data

(62) Division of application No. 08/676,924, filed on Jul. 8, 1996, now abandoned.

(30) Foreign Application Priority Data

| Jul. 6, 1995 | (JP) | 7-170922 |
| Aug. 31, 1995 | (JP) | 7-223081 |
| Nov. 9, 1995 | (JP) | 7-290820 |

(51) Int. Cl.[7] ............... G02B 5/32; G03H 1/26; G03H 1/28; G03H 1/30; G02F 1/1335

(52) U.S. Cl. ............... 359/22; 359/24; 359/19; 359/15; 359/16; 349/62; 349/95; 349/106

(58) Field of Search ............... 359/22, 24, 19, 359/15, 16, 568, 565; 349/5, 106, 62, 63, 95

(56) References Cited

U.S. PATENT DOCUMENTS

| 3,878,537 | A | * | 4/1975 | Roncillat et al. | 340/324 M |
| 3,936,148 | A | * | 2/1976 | Ellis | 350/169 |
| 5,187,597 | A | * | 2/1993 | Kato et al. | 359/22 |
| 5,467,206 | A | * | 11/1995 | Loiseaux et al. | 359/40 |
| 5,506,701 | A | * | 4/1996 | Ichikawa | 359/15 |
| 5,680,231 | A | * | 10/1997 | Grinberg et al. | 359/15 |
| 5,721,598 | A | * | 2/1998 | Smith | 359/15 |
| 5,760,850 | A | * | 6/1998 | Nakanishi et al. | 359/15 |

FOREIGN PATENT DOCUMENTS

| EP | A2 0 298 642 | 1/1989 | G03F/9/00 |
| EP | A2 0 358 425 | 3/1990 | G03F/9/00 |
| GB | A 2 073 950 | 10/1981 | H01L/21/469 |

OTHER PUBLICATIONS

Patent Abstracts of Japan vol. 095, No. 006 Jul. 31, 1995 & JP 07 077610 A (DAI Nippon Printing Co., Ltd.) Mar. 20, 1995 *Abstract.

Patent Abstracts of Japan, vol. 018, No. 596, (P–1825), Nov. 14, 1994 & JP 06 222361 A (DAI Nippon Printing Co., Ltd.) Aug. 12, 1994 *Abstract.

(List continued on next page.)

Primary Examiner—Jon Henry
(74) Attorney, Agent, or Firm—Sughrue Mion, PLLC

(57) ABSTRACT

The present invention provides a hologram color filter having a drastically decreased dependence of diffraction efficiency on wavelength and well corrected for a color balance among the three colors R, G and B comprising an array of converging element holograms 5', each of which enables white light incident at a given angle θ with respect to a normal line of a hologram recorded surface thereof to be spectroscopically separated by wavelength dispersion in a direction substantially along the hologram recorded surface, wherein the converging element holograms 5' have each a plurality of hologram pieces 51 and 52 superposed on each other or multi-recorded therein, which, with respect to the white light 3 incident at the given angle θ, have substantially identical spatial wavelength distributions of wavelength dispersion and different peak wavelengths of diffraction efficiency.

11 Claims, 19 Drawing Sheets

OTHER PUBLICATIONS

Patent Abstracts of Japan, vol. 095, No. 006, Jul. 31, 1995 & JP 07 077609 A (DAI Nippon Printing Co., Ltd.) Mar. 20, 1995 *Abstract.

Patent Abstracts of Japan, vol. 095, No. 001, Feb. 28, 1995 & JP 06 281932 A (DAI Nippon Printing Co., Ltd.) Oct. 7, 1994 *Abstract.

Patent Abstracts of Japan, vol. 095, No. 002, Mar. 31, 1995 & JP 06 308332 A (DAI Nippon Printing Co., Ltd) Nov. 4, 1994 *Abstract.

Patent Abstracts of Japan, vol. 095, No. 007, Aug. 31, 1995 & JP 07 092316 A (DAI Nippon Printing Co., Ltd.) Apr. 7, 1995 * Abstract.

Patent Abstracts of Japan, vol. 095, No. 001, Feb. 28, 1995 & JP 06 281933 A (DAI Printing Co., Ltd.) Oct. 7, 1994 *Abstract.

* cited by examiner

20

20

74

76 Opposing alignment mark

75 Application substrate

HOLOGRAM COLOR FILTER, AND ITS FABRICATION METHOD

This is a divisional of Application No. 08/676,924 filed Jul. 8, 1996, now abandoned, the disclose of which is incorporated herein by reference.

BACKGROUND OF THE INVENTION

The present invention relates generally to a hologram color filter and its fabrication method, and more particularly to a hologram color filter for liquid crystal display devices which is much more reduced in terms of dependence of diffraction efficiency on wavelength and so is well corrected for a color balance among three colors R, G and B, and its fabrication method.

Moreover, the present invention relates generally to an alignment mark and method, and more specifically to an alignment mark for hologram color filters and a method of aligning a hologram color filter and a back matrix.

Applicant has already filed Japanese Patent Application No. 5-12170, etc., to propose a color filter for color liquid crystal display devices, which enables the respective wavelength components of backlight to be more efficiently incident on liquid crystal cells without wasteful absorption as compared with a conventional wavelength absorption type of color filter, whereby the efficiency of utilization of backlight can be greatly improved. This color filter is generally broken down into two types, one of which makes use of an array of an eccentric Fresnel zone plate form of microholograms. Another type utilizes an array of microlenses superposed on a hologram or diffraction grating having parallel and uniform interference fringes thereon. A brief account will now be given of these hologram color filters.

A liquid crystal display device making use of the first type of hologram color filter is explained with reference to FIG. 11 that is a sectional schematic thereof. As shown, a hologram array 5 forming this hologram color filter is spaced away from the side of a liquid crystal display element 6 on which backlight 3 is to be incident, said element 6 being regularly divided into liquid crystal cells 6' (pixels). On the back side of the liquid crystal display element 6 and between the liquid crystal cells 6' there are located black matrices 4. Although not illustrated, polarizing plates are arranged on both sides of the liquid crystal display element 6. As is the case with a conventional color liquid crystal display device, between the black matrices 4 there may additionally be located an absorption type of color filters which transmit light rays of colors corresponding to red, green and blue pixels.

The hologram array 5 comprises microholograms 5' which are arranged in an array form at the same pitch as that of red, green and blue pixels, corresponding to the period of repetition of red, green and blue pixels, i.e., sets of liquid crystal cells 6', each including three adjoining liquid crystal cells 6' of the liquid crystal display element 6 as viewed in a longitudinal direction thereof. One microhologram 5' is located in line with each set of three adjoining liquid crystal cells 6' of the liquid crystal display element 6 as viewed in the longitudinal direction thereof. The microholograms 5' are then arranged in a Fresnel zone plate form such that a green component ray of the backlight 3 incident on the hologram array 5 at an angle θ with respect to its normal line is converged at a middle liquid crystal cell G of the three red, green and blue pixels corresponding to each microhologram 5'. Each or the microhologram 5' in this case is constructed from a relief, phase, amplitude or other transmission type of hologram which has little, if any, dependence of diffraction efficient on wavelength. The wording "little, if any, dependence of diffraction efficiency on wavelength" used herein is understood to refer specifically to a hologram of the type which diffracts all wavelengths by one diffraction grating, much unlike a Lippmann type hologram which diffracts a particular wavelength alone but does not substantially permit other wavelengths to be transmitted therethrough. The diffraction grating having little dependence of diffraction efficiency on wavelength diffracts different wavelengths at different angles of diffraction.

In such an arrangement, consider the incidence of the white backlight 3 from the side of the hologram array 5, which does not face the liquid crystal display element 6 at the angle θ with respect to its normal line. The angle of diffraction of the light by the microholograms 5' varies depending on wavelength, so that convergence positions for wavelengths are dispersed in a direction substantially parallel with the surface of the hologram array 5. If the hologram array 5 is constructed and arranged such that the red wavelength component is diffractively converged at a red-representing liquid crystal cell R; the green wavelength component at a green-representing liquid crystal cell G; and the blue wavelength component at a blue-representing liquid crystal cell B, the color components transmit the corresponding liquid crystal cells without undergoing little or no attenuation through the black matrices 4, so that color displays can be presented depending on the state of the liquid crystal cells 6' at the corresponding positions.

By using the hologram array 5 as a color filter in this way the wavelength components of backlight used with a conventional color filter are allowed to be incident on the liquid crystal cells' without extravagant absorption, so that the efficiency of utilization thereof can be greatly improved.

A liquid crystal display device with the second type of hologram color filter built in it is then explained with reference to FIG. 12 that is a sectional schematic thereof. As illustrated, the second type of hologram color filter generally shown at 10 comprises a hologram 7 and a converging microlens array 8. Microlenses 8' forming part of the microlens array 8 are arranged in an array form at the same pitch as that of red, green and blue pixels, corresponding to the period of repetition of red, green and blue pixels, i.e., sets of liquid crystal cells 6', each including three adjoining liquid crystal cells 6' of a liquid crystal display element 6 as viewed in a longitudinal direction thereof. The hologram 7 is made up of a relief, phase, amplitude or other transmission type of hologram which has thereon parallel and uniform interference fringes that act as a diffraction grating, and has little or no dependence of diffraction efficiency on wavelength. On the back surface of the liquid crystal display element 6 and between the liquid crystal cells 6' there are located black matrices 4. Although not illustrated, polarizing plates are arranged on both sides of the liquid crystal display element 6. As is the case with a conventional color liquid crystal display device, between the black matrices 4 there may additionally be located an absorption type of color filters which transmit light rays of colors corresponding to red, green and blue pixels.

In such an arrangement, consider the incidence of the white backlight 3 from the side of the hologram 7 that is not opposite to the liquid crystal display element 6 at an angle θ with respect to its normal line. The incident light is diffracted at different angles depending on wavelength, and then emerges dispersively from the hologram 7. The dispersed light is in turn separated for each wavelength by the microlenses 8' located on an incident or emergent side of the hologram 7, so that it is converged at focal surfaces thereof. If the color filter 10 is constructed and arranged such that the red wavelength component is diffractively converged at a red-representing liquid crystal cell R; the green wavelength component at a green-representing liquid crystal cell G; and the blue wavelength component at a blue-representing liquid crystal cell B, the color components transmit the corresponding liquid crystal cells 6' without undergoing little or no attenuation through the black matrices 4, so that color displays can be presented depending on the state of the liquid crystal cells 6' at the corresponding positions.

In such a layout, a transmission type of non-converging hologram made up of uniform interference fringes and having little, if any, dependence of diffraction efficiency on wavelength can be used as the hologram 7. Thus, this layout has the advantages of dispensing with any alignment of the hologram 7 with the microlenses 8' forming part of the microlens array 8, and of being easy to make and align because the pitch of the microlens array 8 is three times as large as that of a conventional layout where one microlens is used for each liquid crystal cell 6'.

A modification of FIG. 12 is illustrated in FIG. 13, wherein a microlens array 8 and a liquid crystal display element 6 are located as shown in FIG. 5 with the exception that a hologram 7 made up of parallel and uniform interference fringes that act as a diffraction grating is separate from the microlens array 8 and positioned in backlight 3 almost perpendicularly to the direction of its propagation. In this layout, too, the wavelength components of the backlight are permitted to be incident on liquid crystal cells 6' without extravagant absorption, thus making it possible to achieve a color filter greatly improved in terms of the efficiency of utilization of the backlight.

Such a hologram color filter 5 as mentioned above is fabricated by making a computer generated hologram array and replicating it. More exactly, hologram interference fringes to be defined by the microholograms 5' are computed by a computer, written by electron beams onto an electron beam resist coated on a glass substrate with a chromium film, for instance, being formed thereon, and developed to form a chromium pattern for a relief type of computer generated hologram (CGH) array. Then, the glass substrate is subjected to ion etching using the chromium pattern as a mask to make an original CGH array. Subsequently, while a hologram photosensitive material is superposed on a relief surface of the thus prepared CGH array either in close contact relation to each other or with some gap between them, laser light is directed through the CGH array to the photosensitive material at an angle θ corresponding to the backlight 3 shown in FIG. 11 to cause interference of converging diffracted light and rectilinearly propagating transmitted light produced by CGHs of the CGH array to occur in the hologram photosensitive material, so that the CGH array can be replicated. This replicated hologram is used as the hologram array 5 shown in FIG. 8. Alternatively, a replica of such a replicated hologram may be used as the hologram array 5.

For the purpose of wavelength dispersion, the aforesaid hologram color filter already put forward by the applicant makes use of a hologram having little, if any, dependence of diffraction efficiency on wavelength. When used in practical applications, however, the hologram color filter tends to suffer from diffraction efficiency variations by reason of the diffraction theory per se and because the hologram used has some thickness. Especially for a hologram color filter designed to present liquid crystal displays in the three colors R, G and B, it is desired that a peak of a ridgeline form of diffraction efficiency be located at a region of center wavelength G, thereby placing the three colors in a well-balanced state; diffraction efficiencies of the wavelength regions R and B become lower than that of the wavelength region G. As a consequence, the three colors R, G and B vary- in intensity, resulting in ill-balanced color displays.

To build such a hologram color filter 5 as mentioned above in a liquid crystal display device, it is required that the hologram array 5 be brought into precise alignment with the black matrix 4 located on the back side of the liquid crystal display element 6.

However, the position of the black matrix 4 can be identified in the form of a contrast image, but it is impossible to identify the position of the hologram array 5 in the form of a contrast image by means of ordinary observing techniques, because the hologram array 5 is usually constructed from a phase type of holograms. In addition, as can be seen from the layout shown in FIG. 11, it is impossible to keep the hologram array 5 and black matrix 4 in precise alignment by means of alignment techniques designed to observe the same plane, because they are spaced away from each other at an interval corresponding approximately to the focal length of the microhologram 5'.

SUMMARY OF THE INVENTION

In view of the aforesaid problems associated with prior art hologram color filters, an object of the present invention is to provide a hologram color filter having a remarkably decreased dependence of diffraction efficiency on wavelength and well corrected for a color balance among the three colors R, G and B, and a fabrication method thereof.

Another object of the present invention is to provide an alignment mark used with a phase type of holograms for hologram color filters or the like, and an alignment method using such an alignment mark, especially an alignment mark best suited for bringing a hologram color filter in alignment with pixels of a liquid crystal display element and an alignment method.

To accomplish the aforesaid first object, the present invention provides a hologram color filter comprising an array of converging element holograms, each of which enables white light incident at a given angle with respect to a normal line of a hologram recorded surface thereof to be spectroscopically separated by wavelength dispersion in a direction substantially along the hologram recorded surface, characterized in that said converging element holograms have each a plurality of hologram pieces superposed on each other or multi-recorded therein, which, with respect to said white light incident at a given angle, have substantially identical spatial wavelength distributions of wavelength dispersion and different peak wavelengths of diffraction efficiency.

In this case, it is desired that the superposed or multi-recorded hologram pieces have substantially identical convergence distances at peak wavelengths of diffraction efficiency thereof.

According to the present invention, there is also provided a hologram color filter having a hologram comprising parallel and uniform interference fringes and an array of converging element lenses located on an incident or emergent side thereof, said converging element lenses being each cooperative with said hologram to enable white light incident at a given angle on a hologram recorded surface thereof to be spectroscopically separated by wavelength dispersion in a direction substantially along the hologram recorded surface, characterized in that said hologram comprising parallel and uniform interference fringes has a plurality of hologram pieces superposed on each other or multi-recorded therein, which, with respect to said white light incident at a given angle, have substantially identical spatial wavelength distributions of wavelength dispersion and different peak wavelengths of diffraction efficiency.

In these hologram color filters, it is desired that the spatial wavelength distributions of wavelength dispersion of said superposed or multi-recorded hologram pieces be shifted to each other by an angle of at least 1° between principal rays of central wavelength.

These hologram color filters are preferably used in a color liquid crystal display device having black matrices located between pixels.

To fabricate such hologram color filers, the present invention provides a method of fabricating a hologram color filter comprising an array of converging element holograms, each of which enables white light incident at a given angle with respect to a normal line of a hologram recorded surface thereof to be spectroscopically separated by wavelength dispersion in a direction substantially along the hologram recorded surface, wherein said converging element holograms have each a plurality of hologram pieces superposed on each other or multi-recorded therein, which, with respect to said white light incident at a given angle, have substantially identical spatial wavelength distributions of wavelength dispersion and different peak wavelengths of diffraction efficiency, characterized in that reference light having the same wavelength as one of said peak wavelengths and incident at the same angle of incidence as that of white light for reconstruction and object light converging toward a point at which light of that wavelength is to converge during reconstruction or object light propagating in a direction in which light of that wavelength is to be diffracted during reconstruction are permitted to be concurrently incident on a hologram photosensitive material to record a first hologram piece therein, and simultaneously with or subsequently to this, a second hologram piece is recorded in the hologram photosensitive material using light of the same wavelength as another peak wavelength, similar recording operation being repeated plural times.

In this case, the object light at each peak wavelength is generated in the form of diffracted light obtained by permitting reconstruction illumination light to be incident at the same angle of incidence as white light for reconstruction on an identical computer generated hologram and diffracting said reconstruction illumination light by said computer generated hologram, and the reference light at each peak wavelength is generated in the form of rectilinearly propagating diffracted light of said reconstruction illumination light by said computer generated hologram. Alternatively, an array of holograms each having a plurality of the fabricated hologram pieces superposed on each other or multi-recorded therein is used in place of said computer generated hologram to generate object light and reference light in similar manners, whereby similar recording operation is repeated plural times.

One modification of such a method of fabricating a hologram color filter is characterized in that reference light having a given wavelength and incident at a first angle different from an angle of incidence of white light for reconstruction and object light converging toward a point at which light of that wavelength is to converge during reconstruction are permitted to be concurrently incident on a hologram photosensitive material to record a first hologram piece therein, and simultaneously with or subsequently to this, reference light having said given wavelength and incident at a second angle different from the angle of incidence of white light for reconstruction and said first angle and object light converging toward a point at which light of that wavelength is to converge during reconstruction are permitted to be concurrently incident on the hologram photosensitive material to record a second hologram piece therein, similar recording operation being repeated plural times.

Another modification of such a method of fabricating a hologram color filter is characterized in that reference light having a first wavelength and incident at a first angle different from an angle of incidence of white light for reconstruction and object light converging toward a point at which light of that wavelength is to converge during reconstruction are permitted to be concurrently incident on a hologram photosensitive material to record a first hologram piece therein, and simultaneously with or subsequently to this, reference light having a second wavelength and incident at a second angle different from the angle of incidence of white light for reconstruction and said first angle and object light converging toward a point at which light of that wavelength is to converge during reconstruction are permitted to be concurrently incident on the hologram photosensitive material to record a second hologram piece therein, similar recording operation being repeated plural times.

To accomplish the aforesaid second object, the present invention provides an alignment mark provided on the same substrate as that for a hologram or diffraction grating, characterized by comprising interference fringes or a diffraction grating.

In this case, the hologram or diffraction grating comprises a hologram color filter comprising an array of periodically arranged converging element holograms, each of which enables white light incident at an angle with respect to a normal line of a hologram recorded surface thereof to be spectroscopically separated by wavelength dispersion in a direction along the hologram recorded surface.

Also, the interference fringes or diffraction grating of said alignment mark comprise phase interference fringes or a phase diffraction grating.

The hologram or diffraction grating, too, comprises phase interference fringes or a phase diffraction grating similar to said alignment mark.

It is here to be noted that either a converging phase hologram or a phase diffraction grating having a constant pitch may be used as the alignment mark.

The present invention provides another alignment method of bringing one substrate which is identical with that for a hologram or diffraction grating and is provided thereon with an alignment mark comprising a converging hologram in alignment with another substrate having an opposing alignment mark thereon, characterized in that the alignment mark on said one substrate is illuminated from a given direction to take an image of a convergence point of diffracted light while an image of the opposing alignment mark on said another substrate is taken, and the thus taken images are both displayed on an identical screen to regulate the relative positions of said both substrates.

The present invention provides still another alignment method of bringing one substrate which is identical with that for a hologram or diffraction grating and is provided thereon with an alignment mark comprising a converging hologram in alignment with another substrate having an opposing alignment mark thereon, characterized in that the alignment mark on said one substrate is illuminated from a given direction to form a convergence point of diffracted light in the vicinity of the opposing alignment mark on said another substrate while an image of the vicinity of the opposing alignment mark on said another substrate is taken, and the thus taken images are both displayed on an identical screen to regulate the relative positions of said both substrates.

The present invention provides a further alignment method of bringing one substrate which is identical with that for a hologram or diffraction grating and is provided thereon with an alignment mark comprising a diffraction grating having a constant pitch in alignment with another substrate having an opposing alignment mark thereon, characterized in that the alignment mark on said one substrate is illuminated from a given direction to take an image of the vicinity of said alignment mark by a rectilinearly propagating component or a diffracted component while an image of the opposing alignment mark on said another substrate is taken, and the thus taken images are both displayed on an identical screen to regulate the relative positions of said both substrates.

The present invention provides a still further alignment method of using an alignment mark comprising interference fringes or a diffraction grating provided on a substrate identical with that for a hologram or diffraction grating in given relation to said hologram or diffraction grating to detect a position of said substrate, characterized in that said alignment mark is illuminated from a given direction to take an image of a convergence point of diffracted light or take an image of the vicinity of said alignment mark by a rectilinearly propagating component or a diffracted component, thereby obtaining a contrast image thereof, on the basis of which said substrate can be subjected to given machining.

In the hologram color filter(s) according to the present invention and its fabrication method(s), the converging element holograms forming the hologram color filter or the hologram comprising parallel and uniform interference fringes are each constructed from two hologram pieces superposed on each other or multi-recorded therein, which, with respect to white light incident at a given angle, have substantially identical spatial wavelength distributions of wavelength dispersion and different peak wavelengths of diffraction efficiency. The composite diffraction efficiency distribution given by the two hologram pieces can be made wider and gentler than would be possible with a single hologram, so that a satisfactory color balance is achievable. It is also possible to place the color balance under free control, when it becomes unfavorable due to the geometry of an opening pattern between black matrices, a spectral distribution of a light source, etc., so that the color balance can be corrected with simple arrangements to thereby achieve the optimum color reproduction.

Referring to the alignment mark(s) and alignment method (s) according to the present invention, the alignment mark can be fabricated simultaneously with the fabrication of a main hologram or diffraction grating, because the alignment mark, which comprises interference fringes or a diffraction grating, is designed to be provided on the same substrate as that for a hologram or diffraction grating.

Still other objects and advantages of the invention will in part be obvious and will in part be apparent from the specification.

The invention accordingly comprises in the features of construction, combinations of elements, and arrangement of parts which will be exemplified in the construction hereinafter set forth, and the scope of the invention will be indicated in the claims.

DESCRIPTION OF THE PREFERRED EMBODIMENTS

A detailed account will now be given of the principles of the hologram color filter according to the present invention and some examples of how to fabricate it.

Referring first to FIG. 1, the principles of the hologram color filter according to the present invention are explained. The hologram color filter envisaged in FIG. 1 corresponds to a hologram color filter made up of a microhologram array such as one shown in FIG. 11. As will become apparent from the following description, however, the present invention is also applicable to a hologram color filter comprising a hologram made up of parallel and uniform interference fringes or a diffraction grating and a microlens array on which the hologram or diffraction grating is superposed, such as one shown in FIG. 12.

Figure 1A:
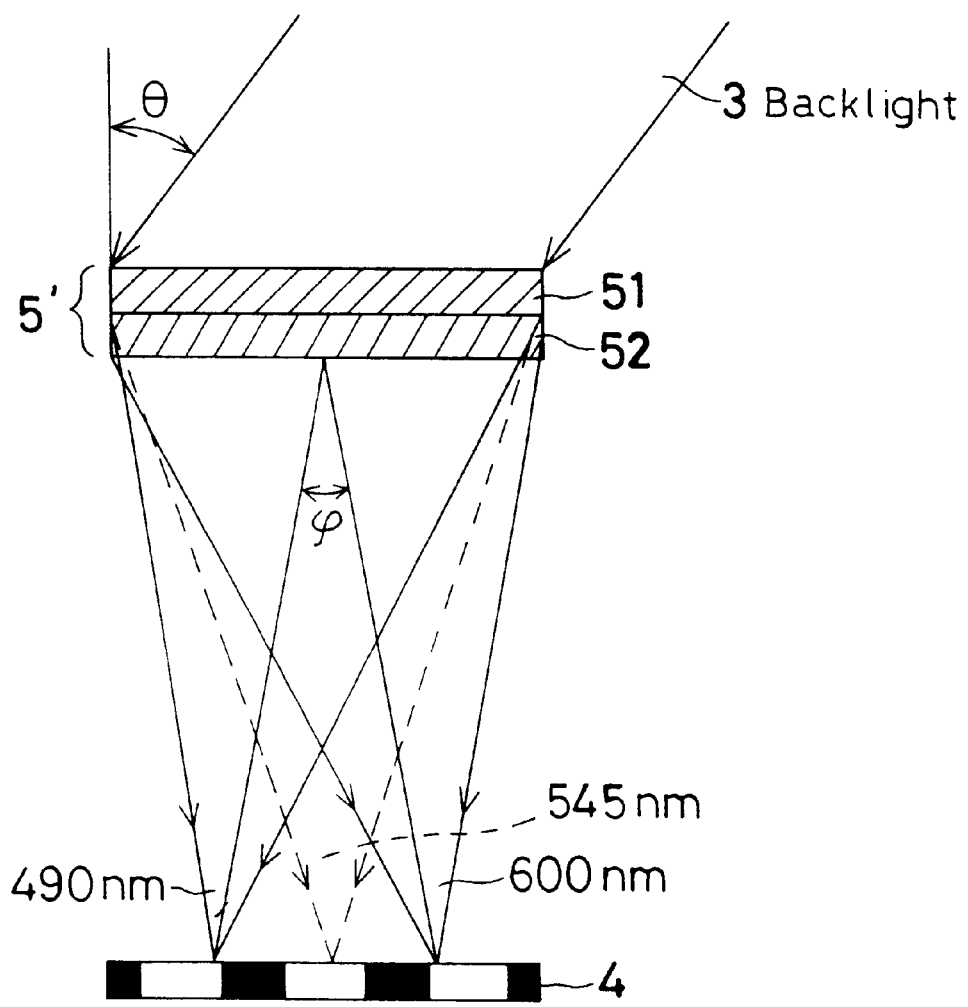
FIG. 1 is a schematic for illustrating the principles of the hologram color filter according to the present invention.
Figure 11:
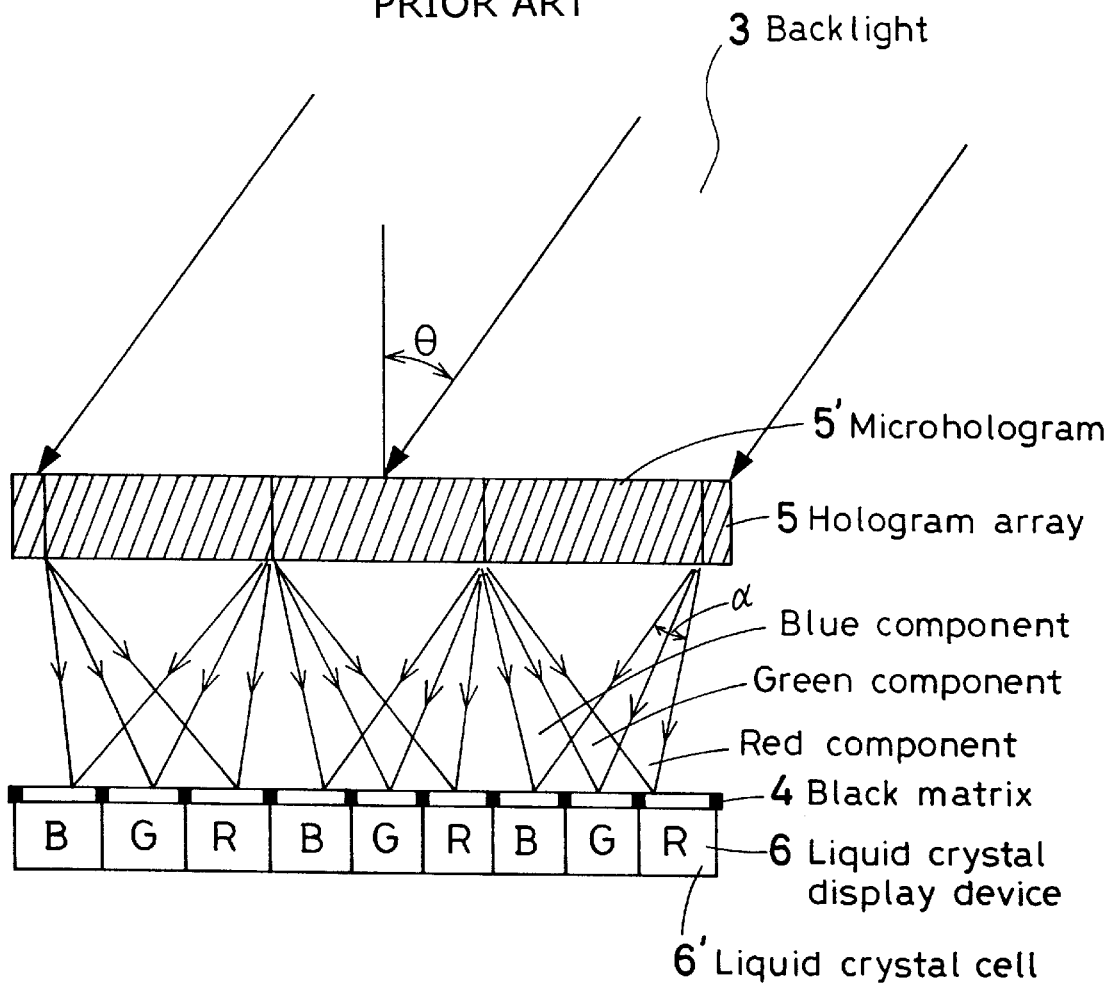
FIG. 11 is a sectional schematic of a liquid crystal display device making use of the first type of conventional hologram color filter.

Referring now to FIG. 1(a), the hologram color filter according to the present invention comprises a hologram color array made up of microholograms 5', each of which is made up of two converging hologram pieces 51 and 52 either superposed on each other or multi-recorded in one photosensitive material, rather than a single converging hologram piece such as one shown in FIG. 11. For a better understanding of what is illustrated and explained, the two converging hologram pieces 51 and 52 are shown (FIG. 1(a)) and described as being superposed on each other. It is to be understood, however, that the following explanation will also be true of the case where the two converging hologram pieces 51 and 52 are multi-recorded in one photosensitive material.

Figure 1B:
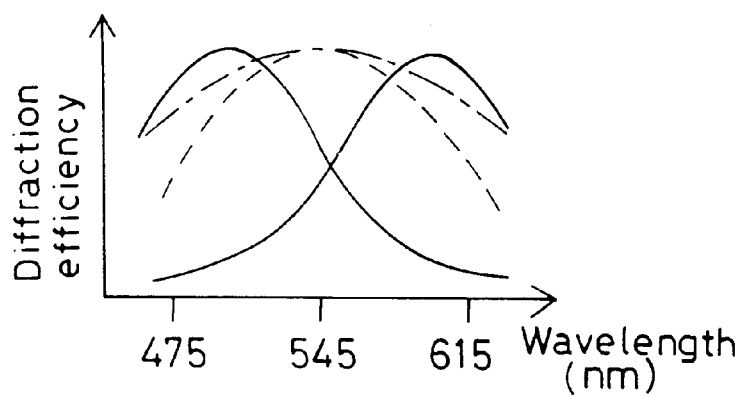

If the microhologram 5' were made up of a single converging hologram piece as shown in FIG. 11, white backlight 3 incident on the microhologram 5' at an angle θ of incidence is dispersed and converged in a direction substantially parallel with the microhologram 5' with such a spatial wavelength distribution as shown in FIG. 1(b). Then, diffraction efficiency depending wavelength has a ridgeline form of distribution as shown by a broken line in FIG. 1(b), with a peak wavelength thereof found at 545 nm for instance. Thus, the diffraction efficiency varies actually depending on wavelength, as shown in FIG. 1(b), by reason of the diffraction theory per se and because a hologram has some thickness. With the peak wavelength of diffraction efficiency lying at the green area, the diffraction efficiencies of the red and blue areas are lower than that of the green area. This in turn causes the three colors R, G and B to suffer from intensity variations and, hence, become ill-balanced for color displays.

In the hologram color filter according to the present invention, however, one converging hologram piece 51 has a peak wavelength of diffraction efficiency preset at 490 nm for instance and another converging hologram piece 52 has a peak wavelength of diffraction efficiency preset at 600 nm for instance (a ridgeline form of two distributions indicated by solid lines in FIG. 1(b)), both with respect to the white backlight 3 incident on the microhologram 5' at the same angle θ of incidence. In addition, the convergence positions of those peak wavelengths are preset such that they coincide approximately with a position, at which light of the corresponding wavelength is to be converged in the case where the microhologram 5' is made of a single converging hologram piece, at least in a direction along the surface of the microhologram 5'. It is here to be noted that when the microhologram 5' is made up of a single converging hologram piece, a convergence distance (focal length) from the microhologram 5' in fact varies somewhat depending on wavelength; the longer the wavelength is, the shorter the focal length is, and vice versa. However, it is desired that the focal lengths of the hologram pieces 51 and 52 at the peak wavelengths of their diffraction efficiency be preset such that they are approximately equal to each other.

The spatial wavelength distributions of wavelength dispersion due to the hologram pieces 51 and 52, which are superposed on each other or multi-recorded in a photosensitive material, are approximately coincident with each other, with the peak wavelengths of diffraction efficiency being different from each other. Upon the white backlight 3 incident at the same angle θ of incidence on the microhologram 5' obtained by superposing two such hologram pieces 51 and 52 on each other or multi-recording them in a photosensitive material, the diffracted and dispersed light has such a spatial wavelength and diffraction efficiency distribution as shown by a one-dot chain line in FIG. 1(b), with the apex breadth thereof being larger than that of the distribution shown by a broken line in FIG. 1(b). Thus, the diffraction efficiencies of the red and blue areas do not largely decrease, even when compared with that of the green area; the three colors R, G and B can have approximately the same intensity, so that they can be well balanced with one another during color displays. It is here to be noted that the number of hologram pieces to be superposed on each other or multi-recorded in a photosensitive material (that is coincident with the number of peak wavelengths of diffraction efficiency) is not limited to two, and so may be three or more. In this case, too, the spatial wavelength distributions of wavelength dispersion due to the hologram pieces can be approximately coincident with each other while the peak wavelengths of diffraction efficiency can be different from each other, so that the dependence of diffraction efficiency on wavelength can be greatly reduced as a whole.

Figure 2A:
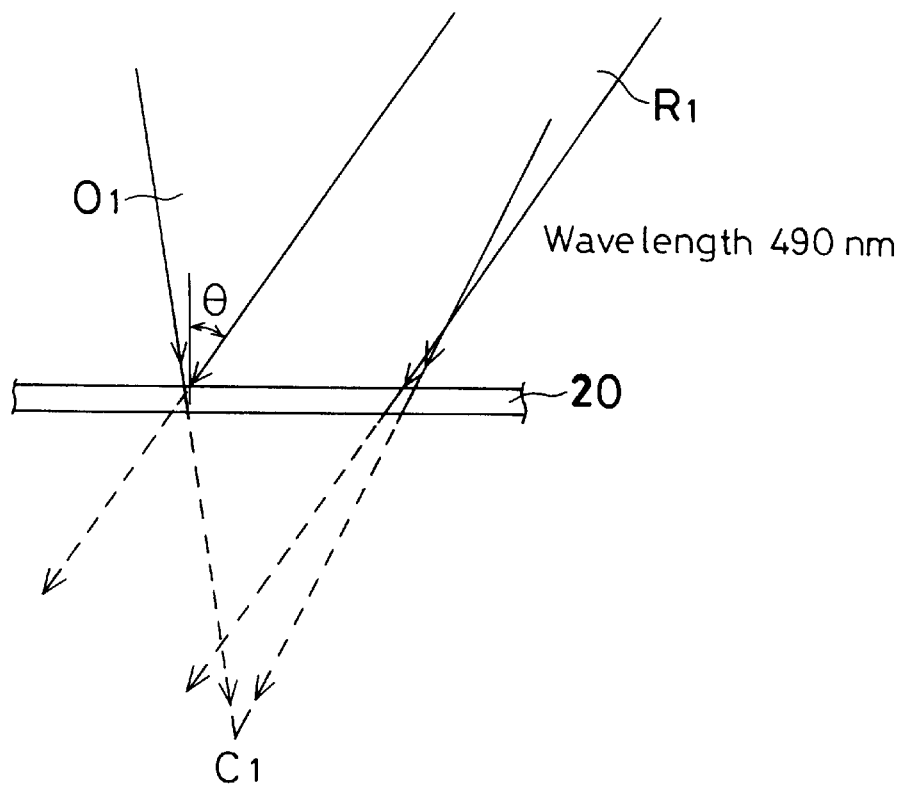
FIG. 2 is a schematic for illustrating a first method of fabricating the hologram color filter according to the present invention.
Figure 2B:
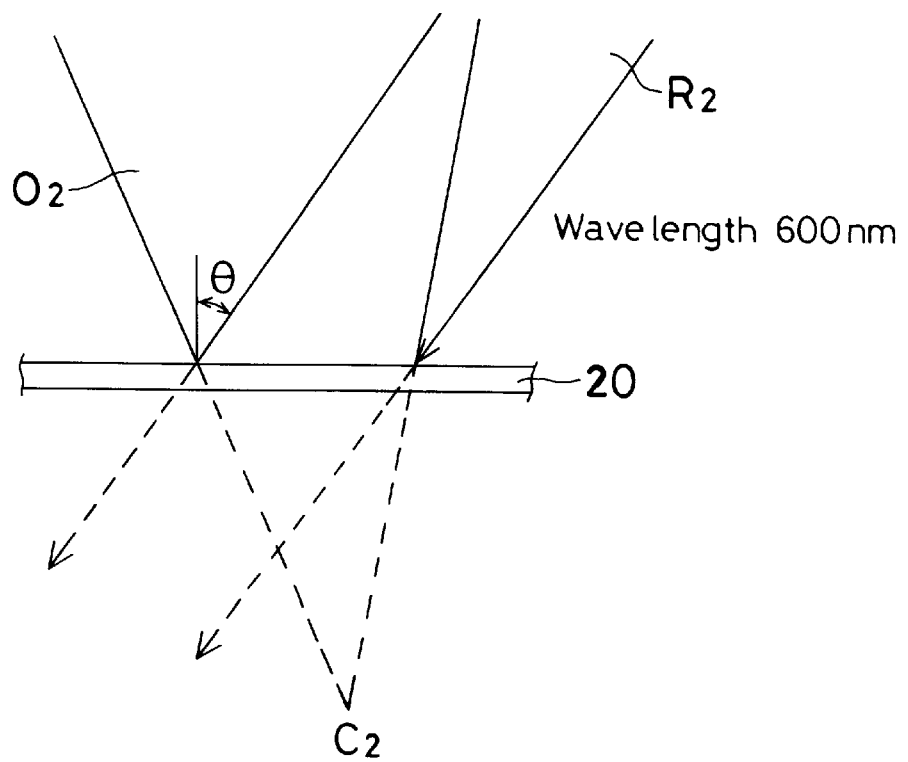

The microhologram 5' having a plurality of such hologram pieces 51 and 52 superposed on each other or multi-recorded therein is fabricated by three methods. For the purpose of simplicity, an easy-to-understand method is first explained with reference to multi-recording as an example. Here assume that the hologram photosensitive material used undergoes neither expansion nor contraction. As illustrated in FIG. 2(a), reference light $R_1$, which has the same wavelength as one peak wavelength (for example, 490 nm as already mentioned) and is incident at the same angle θ of incidence as backlight 3 used for reconstruction, and object light $O_1$, which converges toward a point $C_1$ at which light of that wavelength is to converge during reconstruction, are allowed to be concurrently incident on a hologram photosensitive material 20 located at a position of the microhologram 5' to be reconstructed, thereby recording a first hologram piece 51 therein. Then, as shown in FIG. 2(b), reference light $R_2$, which has the same wavelength as another peak wavelength (for example, 600 nm as already mentioned) and is incident at the same angle θ of incidence as the backlight 3 used for reconstruction, and object light $O_2$, which converges toward a point $C_2$ at which the light of that wavelength is to converge during reconstruction, are allowed to be concurrently incident on the hologram photosensitive material 20, thereby recording a second hologram piece 52 therein. Recording three or more hologram pieces, too, may be achievable in the same process as mentioned just above.

Figure 3:
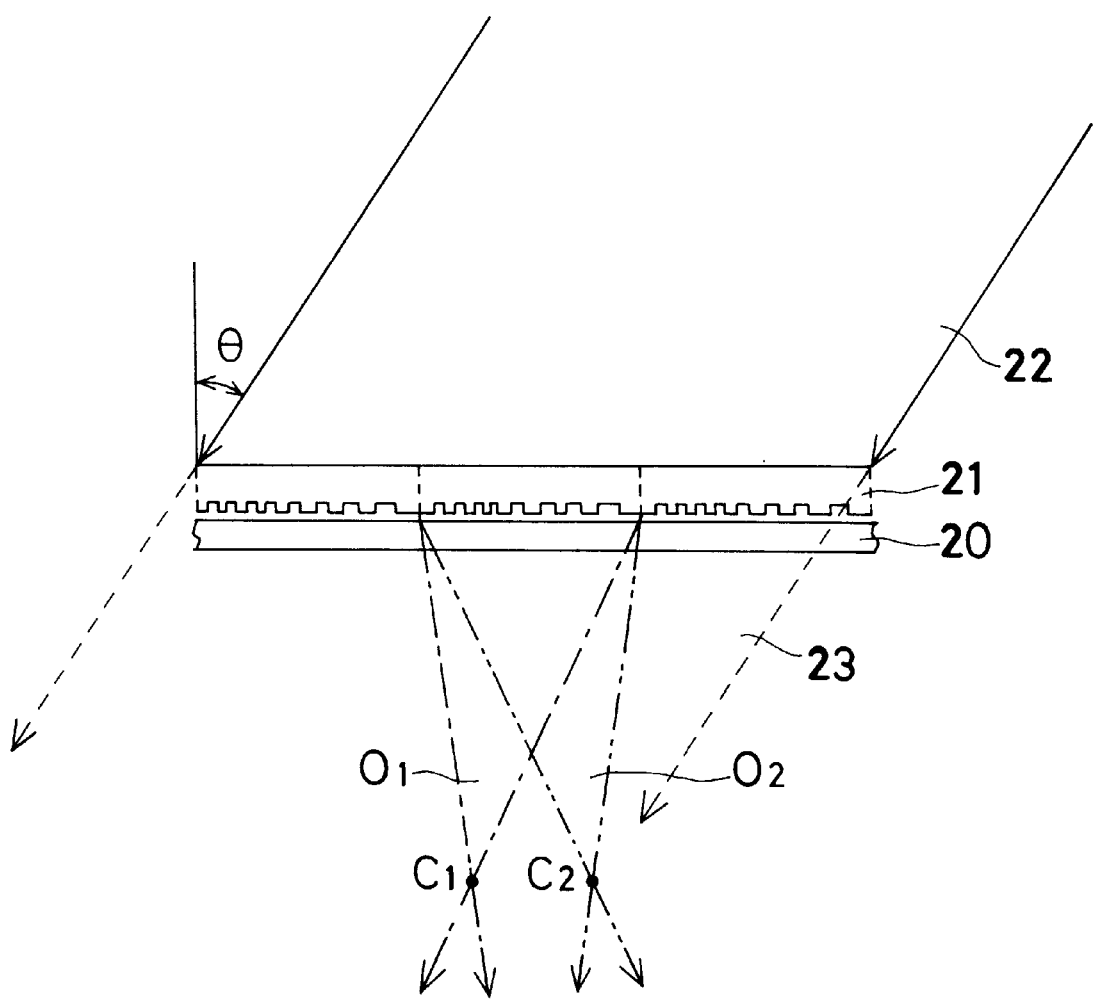
FIG. 3 is a schematic for illustrating a modification of the fabrication method shown in FIG. 2.

A modification of the fabrication method shown in FIG. 2 is then explained. A single computer generated hologram (CGH) 21 is produced, which, as in the case of the microhologram 5', disperses and converges white backlight with such a spatial wavelength distribution as shown in FIG. 1(b) (whose peak wavelength lies around 545 nm for instance). Hologram interference fringes having such dispersing and converging function as mentioned above are computed by a computer, written by electron beams onto a glass substrate coated with an electron beam resist, and developed to make a relief type CGH 21. Then, as shown in FIG. 3, a hologram photosensitive material 20 is superposed on a relief surface of the thus made CGH 21 in close contact relation thereto or with some gap between them. Subsequently, reconstruction illumination light 22 having a plurality of the same wavelengths as the peak wavelengths of diffraction efficiency (for instance, 490 nm and 600 nm as already mentioned) is permitted to be incident on the CGH 21 at an angle θ of incidence corresponding to the backlight 3 shown in FIG. 1. Thereupon, the reconstruction illumination light 22 is split into a light beam of one wavelength (for instance, 490 nm as already noted), which defines object light $O_1$ diffracted by CGH 21 and converging toward a point $C_1$, and a light beam of another wavelength (for instance, 600 nm as already noted), which defines object light $O_2$ diffracted by CGH 21 and converging toward a point $C_2$. A portion of the reconstruction illumination light 22 passes rectilinearly through CGH 21 to define rectilinearly propagating transmitted light 23. In the hologram photosensitive material 20, the object light $O_1$ interferes with a component of one wavelength of the rectilinearly propagating transmitted light 23 while the object light $O_2$ interferes with a component of another wavelength of the transmitted light 23, so that first and second hologram pieces 51 and 52 can be multi-recorded therein. The same also holds for when there are three or more peak wavelengths of diffraction efficiency. While the reconstruction illumination light 22 used has been described as being light containing concurrently a plurality of the same wavelengths as the peak wavelengths of diffraction efficiency, it is understood that light beams of individual wavelengths may be used for illumination whereby hologram pieces are sequentially multi-recorded in the same hologram photosensitive material 20 or, alternatively, separately recorded in separate hologram photosensitive materials 20 for superposition.

The hologram obtained by such replication may be used immediately as the hologram color filter 5. It is desired, however, that this replicated hologram be used in the form of an original plate because the original plate can be used in place of CGH 21 of FIG. 3 for multiple replication of the hologram color filter 5. When the hologram color filter 5 is obtained from CGH 21 by repeating a similar replication process two or more times, it is desired that a volume phase type of hologram photosensitive material be used as the hologram photosensitive material 20 at replication stages except the last replication stage, because the next replication can be carried out with high efficiency.

Figure 4:
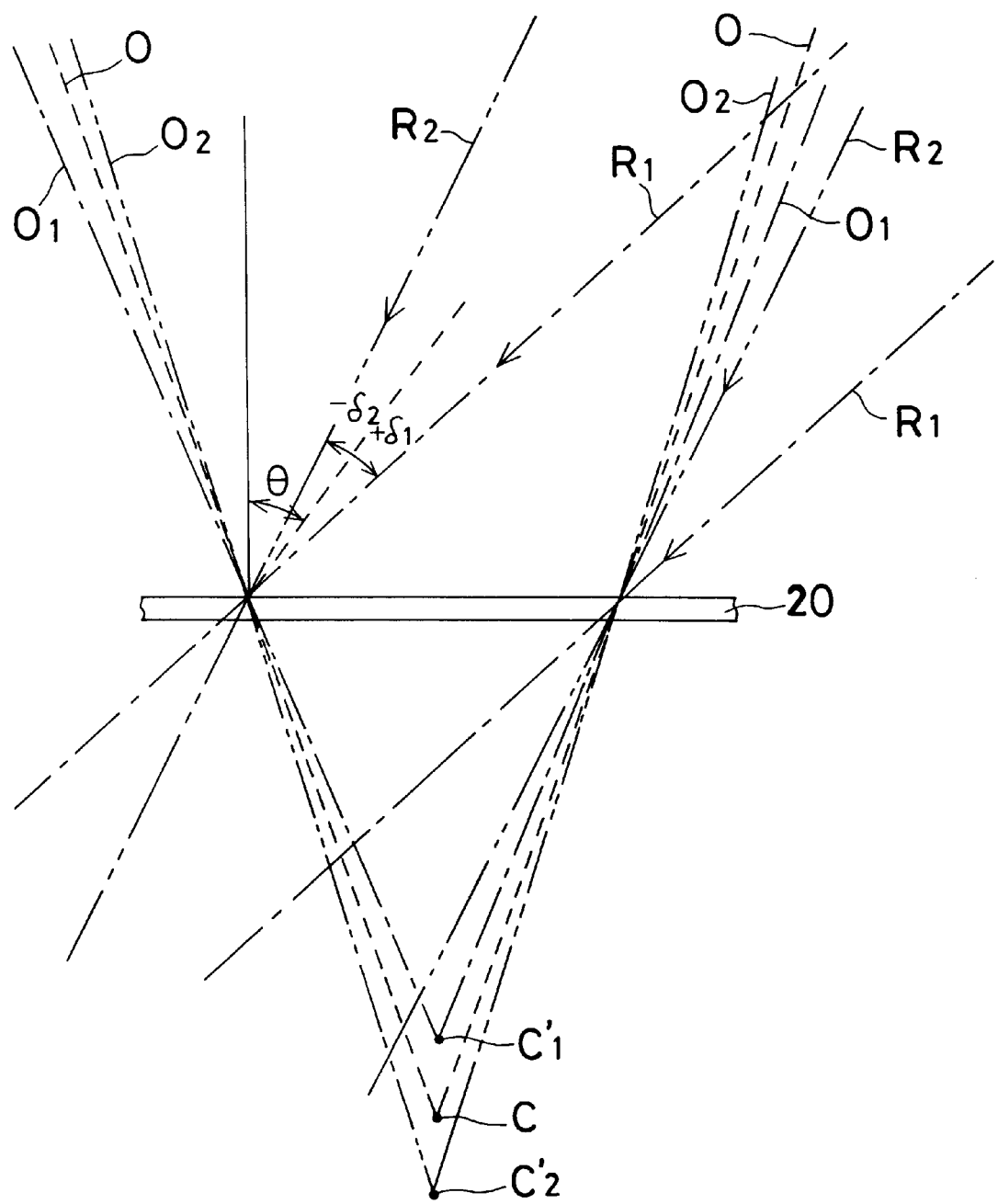
FIG. 4 is a schematic for illustrating a second method of fabricating the hologram color filter according to the present invention.

Another method of fabricating the microhologram 5' having a plurality of hologram pieces 51 and 52 superposed on each other or multi-recorded therein is to multi-record the two hologram pieces 51 and 52 in a hologram photosensitive material using common light of one wavelength (for instance, 545 nm) lying between both peak wavelengths (for instance, 490 nm and 600 nm as already noted). According to this method, as shown in FIG. 4, reference light $R_1$ (a one-dot chain line) is permitted to be incident on a hologram photosensitive material 20 at an angle of incidence larger than the angle θ of incidence of backlight 3 used for reconstruction by a given angle $\delta_1$, said material being located at a reconstruction position of the microhologram 5'. At the same time, object light, which converges toward a point C at which light of that wavelength (for instance, 545 nm) is to converge during reconstruction, is used as object light O (a broken line), thereby recording the hologram piece 51 in the photosensitive material. Then, reference light $R_2$ (a two-dot chain line) is allowed to be incident on the hologram photosensitive material 20 at an angle of incidence smaller than the angle θ of incidence of the backlight 3 used for reconstruction by a given angle $\delta_2$. At the same time, object light, which converges toward a point C as mentioned above, at which light of that wavelength (for instance, 545 nm) is to converge during reconstruction, is used as object light O (a broken line), to thereby record the hologram piece 52 in the photosensitive material.

Thus, the two hologram pieces are multi-recorded in the photosensitive material using the common light of one wavelength lying between both peak wavelengths. Upon the white backlight 3 incident at the angle θ of incidence on the hologram piece 51 recorded by reference light $R_1$, the wavelength at which the diffraction efficiency of the hologram piece 51 reaches a maximum is shifted to a shorter wavelength side relative to the recording wavelength, and a convergence position of the thus shifted wavelength is shifted to the left relative to the point C shown in FIG. 4. In other words, this hologram piece 51 acts much like the hologram piece 51 recorded as shown in FIG. 2(*a*). Upon the white backlight 3 incident at the angle θ of incidence on the hologram piece 52 recorded by the reference light $R_2$, on the other hand, the wavelength at which the diffraction efficiency of the hologram piece 52 reaches a maximum is shifted to a longer wavelength side relative to the recording wavelength, and a convergence position of the thus shifted wavelength is shifted to the right relative to the point C shown in FIG. 4. In other words, this hologram piece 52 behaves much like the hologram piece 52 recorded as shown in FIG. 2(*b*). This can be explained straightforward assuming that a thin Bragg grating can be thought of as the recorded hologram interference fringes. It is to be noted that to enable the hologram pieces 51 and 52 recorded by the methods of FIGS. 2 and 4 to have the same spatial wavelength distribution, it is required that the sum $(\delta_1+\delta_2)$ of angle-of-incidence deviations of the reference light during recording be approximately equal to φ where φ is the angle between principal rays of both peak wavelengths during reconstruction (FIG. 1). At a recording wavelength lying mediate between both peak wavelengths, $\delta_1=\delta_2=\phi/2$. With this method, too, three or more holograms may be recorded on similar principles with respect to three or more different peak wavelengths of diffraction efficiency.

In the foregoing explanation made with reference to FIG. 4, the object light used for the recording of both hologram pieces 51 and 52 has been assumed to be the same light beam (a broken line). However, the wavelength at which the diffraction efficiency of the hologram piece 51 reaches a maximum is shifted to a shorter wavelength side, and a convergence position of the thus shifted wavelength is shifted to the left relative to the point C in FIG. 4, so that the light can converge at a point located farther off the hologram piece 51 (hologram photosensitive material 20). To the contrary, the wavelength at which the diffraction efficiency of the hologram piece 52 reaches a maximum is shifted to a longer wavelength side, and a convergence position of the thus shifted wavelength is shifted to the right relative to the point C in FIG. 4, so that the light can converge at a point located nearer to the hologram piece 52 (hologram photosensitive material 20). To allow the focal lengths of the hologram pieces 51 and 52 to be approximately equal to each other at their respective peak wavelengths of diffraction efficiency, it is therefore preferred that a light beam converging at a point $C_1'$ located nearer to the hologram photosensitive material 20 rather than at the point C be used as the object light $O_1$ for the recording of the hologram piece 51, and that a light beam converging at a point $C_2'$ located farther off the hologram photosensitive material 20 rather than at the point C be used as the object light $O_2$ for the recording of the hologram piece 52.

It is here to be noted that with the method of FIG. 4 it is impossible to record a plurality of hologram pieces by simultaneous multi-exposure, because it is required to use light of the same wavelength for this purpose. The reason is that the reference light RI and $R_2$ interfere mutually with the object light $O_1$ and $O_2$ or the reference light $R_1$ and object light $O_2$ interfere mutually with the reference light $R_2$ and object light $O_1$ to produce and record unnecessary interference fringes. For this reason, a plurality of hologram pieces are sequentially multi-recorded by exposure. To prevent the generation of such unnecessary interference fringes and, hence, enable simultaneous multi-exposure, any possible interference of one light with another should preferably be avoided. In other words, the generation of such unnecessary interference fringes as mentioned above can be avoided by using p-polarized light as light for the recording of one hologram piece 51, and s-polarized light as light for the recording of another hologram piece 52, because there is no interference between both. Alternatively, separate light sources (lasers) may be used to separately record one hologram piece 51 and another hologram piece 52. With separate light sources, such unnecessary interference fringes as mentioned above are not produced because the light emitted is incoherent even at the same wavelength.

Figure 5:
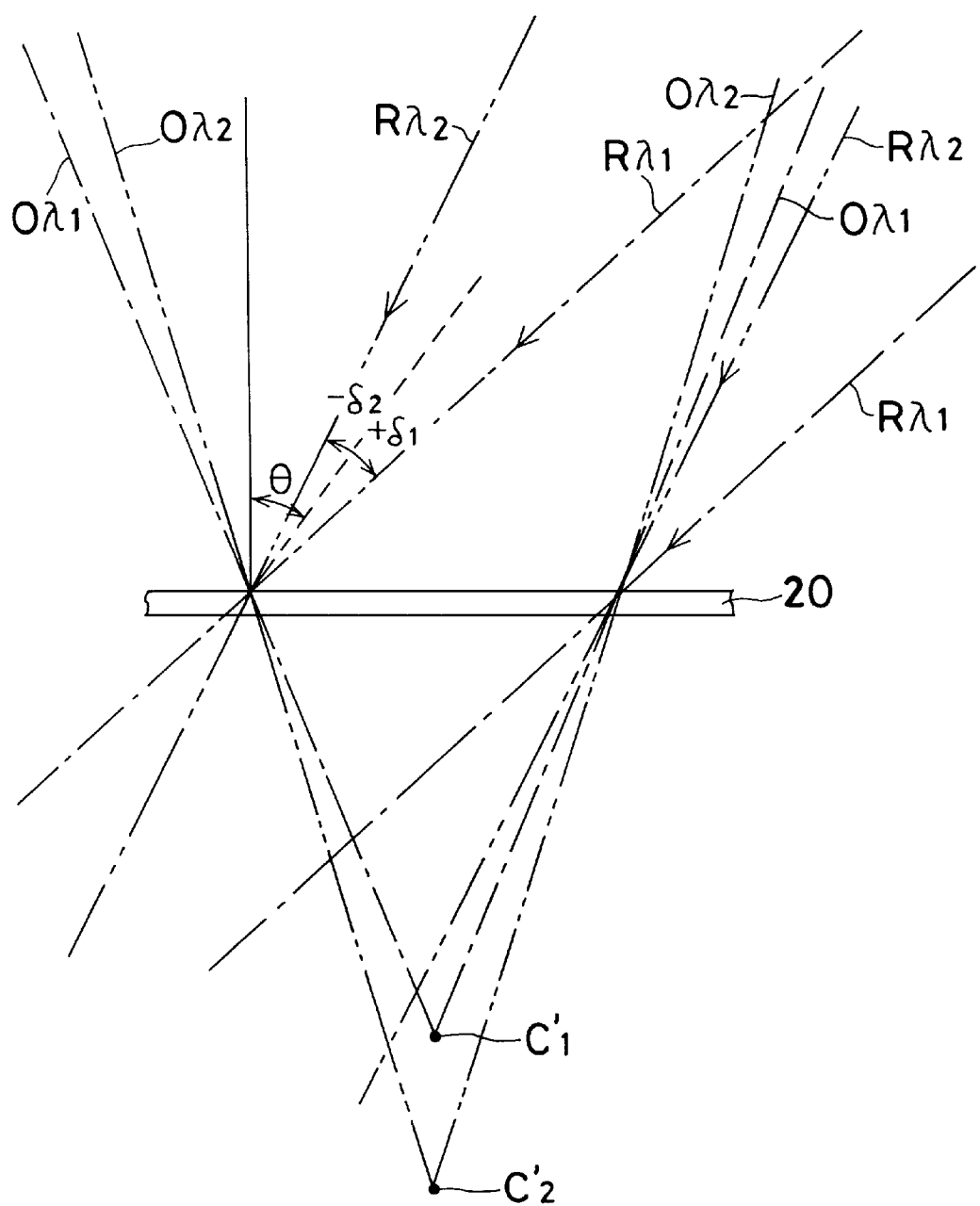
FIG. 5 is a schematic for illustrating a third method of fabricating the hologram color filter according to the present invention.

Still another method of fabricating the microhologram 5' having a plurality of hologram pieces 51 and 52 superposed on each other or multi-recorded therein makes use of an arrangement similar to that shown in FIG. 4, except that the two hologram pieces 51 and 52 are multi-recorded therein using light beams of separate two wavelengths $\lambda_1$ and $\lambda_2$ lying between both peak wavelengths (for instance, 490 nm and 600 nm as already noted). Here consider that one hologram piece 51 ($\lambda_1$) with the peak of diffraction efficiency found on a shorter wavelength side and one hologram piece 52 ($\lambda_1$) with the peak of diffraction efficiency on a longer wavelength side are first produced using light of wavelength $\lambda_1$, and another hologram piece 51 ($\lambda_2$) with the peak of diffraction efficiency found on a shorter wavelength side and another hologram piece 52 ($\lambda_2$) with the peak of diffraction efficiency on a longer wavelength side are then produced using light of a different wavelength $\lambda_2$ according to the method of FIG. 4. Spatial wavelength distributions of wavelength dispersion due to these four hologram pieces 51 ($\lambda_1$), 52 ($\lambda_1$), 51 ($\lambda_2$) and 52 ($\lambda_2$) are approximately in coincidence with one another. Then, consider a combination of hologram pieces 51 ($\lambda_1$) and 52 ($\lambda_2$) or hologram pieces 51 ($\lambda_2$) and 52 ($\lambda_1$). As in the case of the first method (FIGS. 2 and 3) or the second method (FIG. 4), there is obtained a microhologram having a plurality of hologram pieces superposed on each other or multi-recorded therein, with different peaks of diffraction efficiency and approximately identical spatial wavelength distributions of wavelength dispersion. More specifically, as shown in FIG. 5, the hologram piece 51 ($\lambda_1$) is recorded using reference light R$\lambda_1$ of wavelength $\lambda_1$ with the angle of incidence larger than the angle θ of incidence of the backlight 3 used for reconstruction by a given angle $\delta_1$ (a one-dot chain line), and object light O$\lambda_1$ converging toward the point $C_1'$ of wavelength $\lambda_1$. Simultaneously with or subsequently to this, the hologram piece 52 ($\lambda_2$) is recorded using reference light R$\lambda_2$ of wavelength $\lambda_2$ with the angle of incidence smaller than the angle θ of incidence of the backlight 3 used for reconstruction by a given angle $\delta_2$ (a two-dot chain line), and object light O$\lambda_2$ converging toward the point $C_2'$ of wavelength $\lambda_2$. In this case, the magnitudes of the angles $\delta_1$ and $\delta_2$ and the positions of the points $C_1'$ and $C_2'$ may be determined depending on the wavelength $\lambda_1$ and $\lambda_2$ according to the concept underlying the second method.

Figure 6:
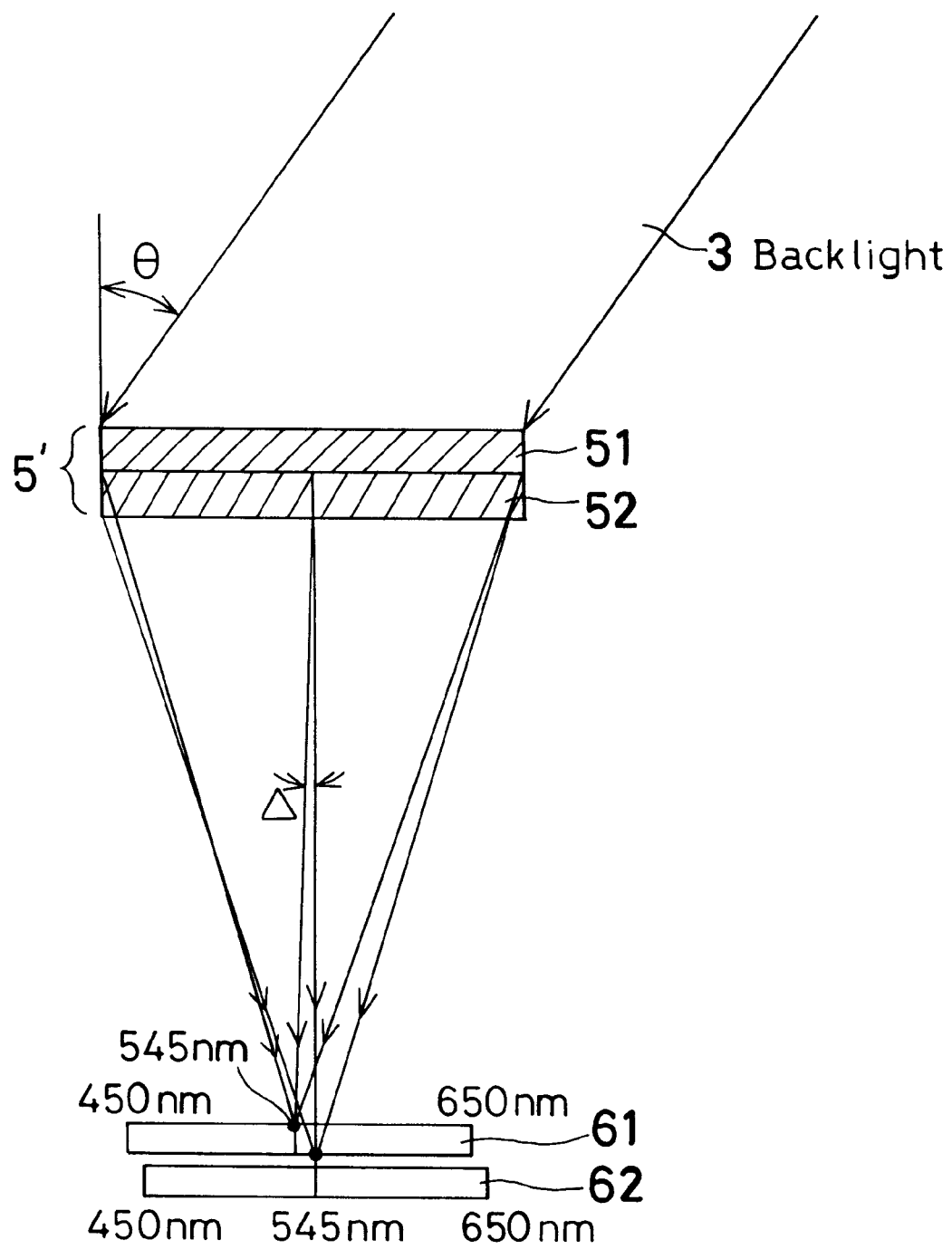
FIG. 6 is a schematic for illustrating a layout designed to prevent rediffraction by a second of superposed hologram pieces.

In the foregoing explanation, the converging hologram pieces 51 and 52 to be superposed on each other or multi-recorded in a single photosensitive material have been assumed to be approximately coincident with each other in terms of the spatial wavelength distribution of wavelength dispersion. However, especially when two hologram pieces are recorded in separate photosensitive materials for their superposition, a problem arises if both have the same spatial wavelength distribution of wavelength dispersion, albeit having different peak wavelengths of diffraction efficiency; in a wavelength region where diffraction efficiency-representing curves overlap each other (see solid lines in FIG. 1(b)), it is unlikely that all of the light diffracted by the first hologram piece 51 in the backlight 3 passes through the second hologram piece 52. In other words, a portion of the diffracted light is rediffracted by the second hologram piece 52 in a direction along which the backlight 3 travels rectilinearly. An explanation to enable a better understanding of this phenomenon is that wave fronts diffracted by the first hologram piece 51 are the same as object wave fronts in the recording of the second hologram piece 52, and that the wave fronts diffracted by the first hologram piece are diffracted by the second hologram piece in a direction of recording reference wave fronts. To prevent this phenomenon, various recording parameters may be taken into consideration such that the spatial wavelength distributions of wavelength dispersion of the two hologram pieces 51 and 52 are mutually somewhat misaligned. In FIG. 6, let reference numeral 61 represent a spectrum (spatial wavelength distribution) of the backlight 3 incident at the angle θ of incidence upon dispersed and spectroscopically separated by the converging hologram piece 51 alone and 62 represent a spectrum upon dispersed and spectroscopically separated by the converging hologram piece 52 alone. As shown schematically therein, the hologram pieces 51 and 52 are fabricated such that both spectra 61 and 62 are kept in slight misalignment rather than in alignment. The amount of this misalignment is represented by an angle Δ of the spectroscopically separated center wavelength (545 nm in the illustrated arrangement) between principal rays, and satisfactory results are obtainable at an angle Δ of at least 1°. Such a small misalignment of the spectral positions offers no problem in view of color reproducibility. To put it in another way, the upper limit of the aforesaid misalignment amount may be determined within a range wherein color reproducibility remains intact.

For instance, hologram photosensitive materials 20 of the following layer structures may be used to fabricate the superposed or multi-recorded microhologram 5' by the fabrication methods shown in FIGS. 2 to 5.

(1) Single-Layer Multi-Recording

Figure 7A:
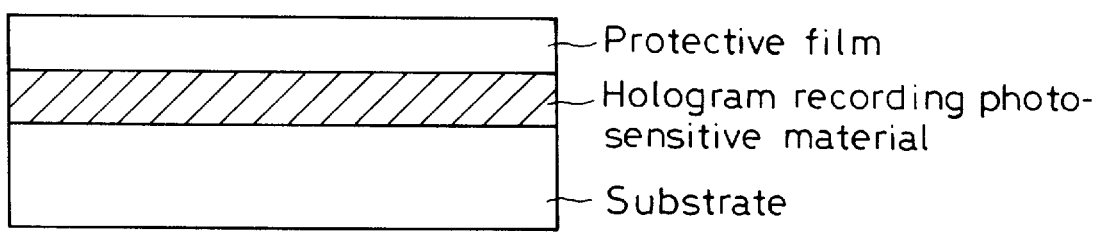
FIG. 7 is a schematic that exemplifies one layer structure of a hologram photosensitive material used with the fabrication method according to the present invention.

When interference fringes are multi-recorded in a single-layer hologram recording photosensitive material sensitive to all the wavelengths to be recorded, a plurality of hologram pieces 51 and 52 are recorded in the form of interference fringes of varying pitches, using a hologram photosensitive material 20 of such layer structure as illustrated typically in FIG. 7(a). To record interference fringes in a single layer while they are superposed on each other, it is then required that the condition for the distribution of a refractive index modulation Δn be optimized. When multi-recording is carried out with a photopolymer hologram recording photosensitive material of the type designed to record interference fringes therein by monomer migration such as one put by Du Pont, USA on the market under the trade mark of Omnidex, it is possible to make the relative length of monomer migration so short that the sum of Δn can be more increased than would be possible with monochromatic recording.

(2) Multi-Layer Separation Recording

Figure 7B:
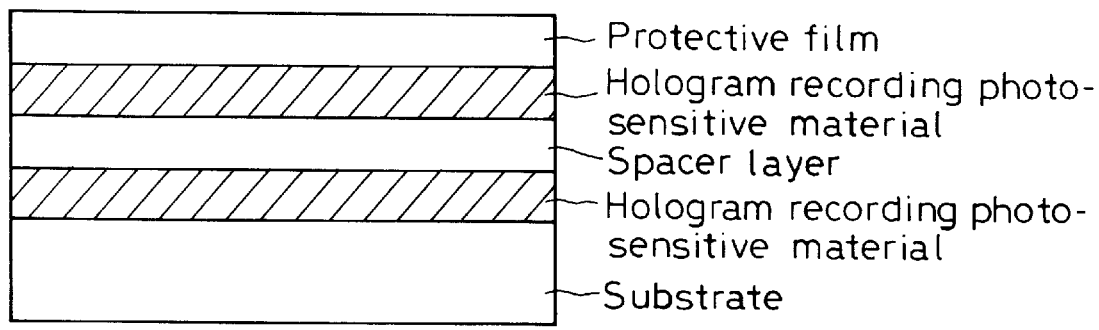

When hologram recording photosensitive materials, each sensitive to at least one wavelength of a plurality of wavelengths to be recorded, are stacked together with a transparent spacer layer located between them for the purpose of recording interference fringes therein, use is made of a hologram photosensitive material 20 of such layer structure as illustrated typically in FIG. 7(*b*). With a photopolymer hologram recording photosensitive material of the type designed to record interference fringes therein by monomer migration such as one put by Du Pont, USA on the market under the trade mark of Omnidex, it is often impossible to record interference fringes precisely therein, because monomer migration occurs between hologram recording photosensitive materials due to the absence of any spacer. An arrangement shown in FIG. 7(*b*), wherein hologram recording photosensitive materials, each preferentially sensitive to laser light of different wavelengths, are stacked together with a spacer located between them, is advantageous in that desired interference fringes can be separately recorded in the separate photosensitive materials.

Figure 8:
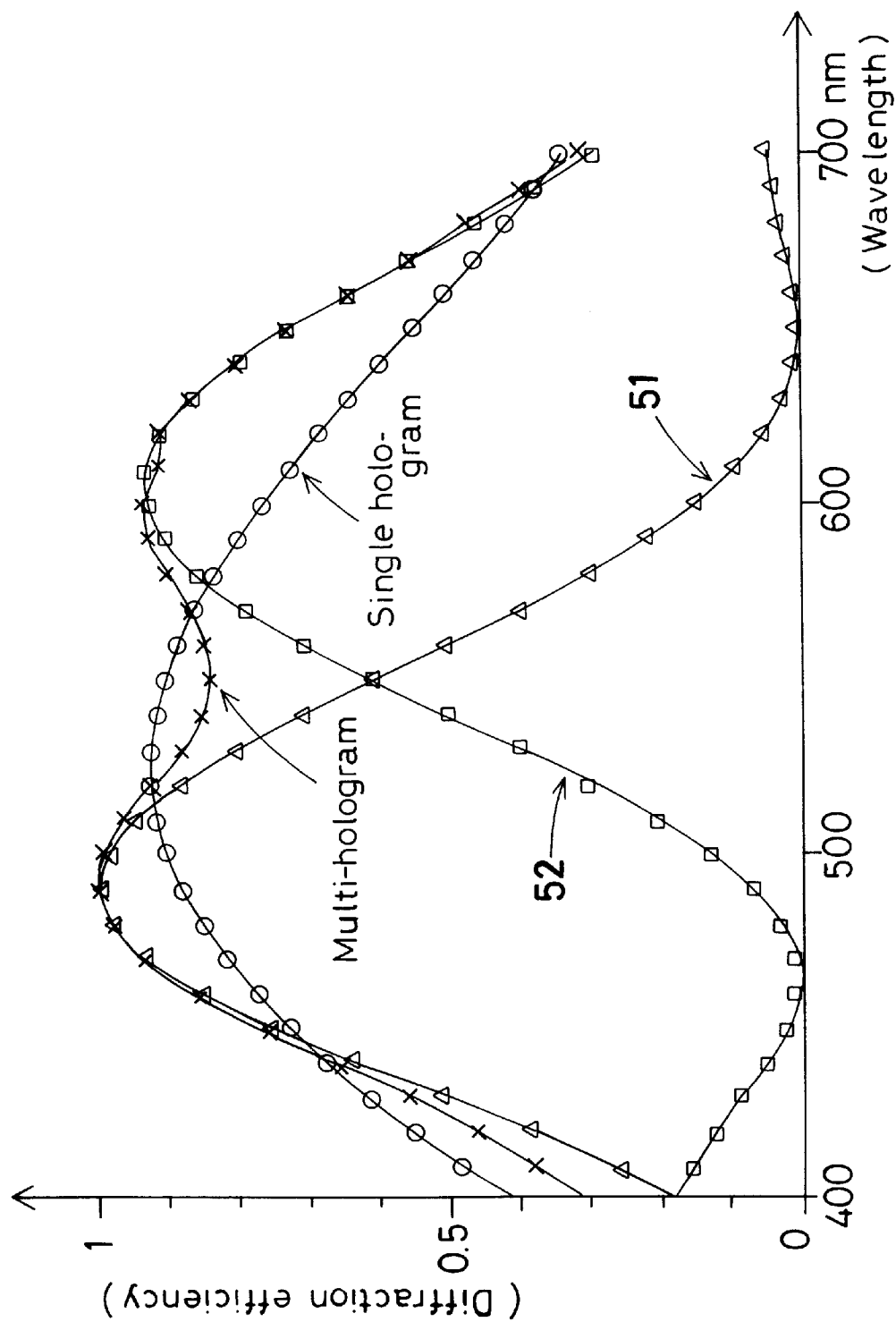
FIG. 8 is a graphical view that shows a diffraction efficiency distribution of one embodiment of the present invention with respect to wavelength.

One illustrative example of the hologram color filter 5 according to the present invention is shown in FIG. 8 wherein there are plotted diffraction efficiency of a conventional microhologram 5' (FIG. 11) consisting of a single hologram piece depending on wavelength (shown by a curve marked with circles and reaching a peak at 520 nm), diffraction efficiency of one hologram piece 51 according to the present invention (shown by a curve marked with triangles and reaching a peak at 490 nm), diffraction efficiency of another hologram piece 52 (shown by a curve marked with squares and reaching a peak at 600 nm), and composite diffraction efficiency of a hologram piece 51 and 52 combination (shown by a curve marked with crosses). It is here to be noted that the conventional single hologram piece is of a phase distribution type wherein interference fringes are recorded at a refractive index modulation Δn=0.035 in a 6-μm thick photopolymer with the average refractive index being n=1.52 while each of the hologram pieces 51 and 52 is of a phase distribution type wherein interference fringes are recorded at a refractive index modulation Δn=0.020 in a 1.2-μm thick photopolymer with the average refractive index being n=1.52.

Figure 9:
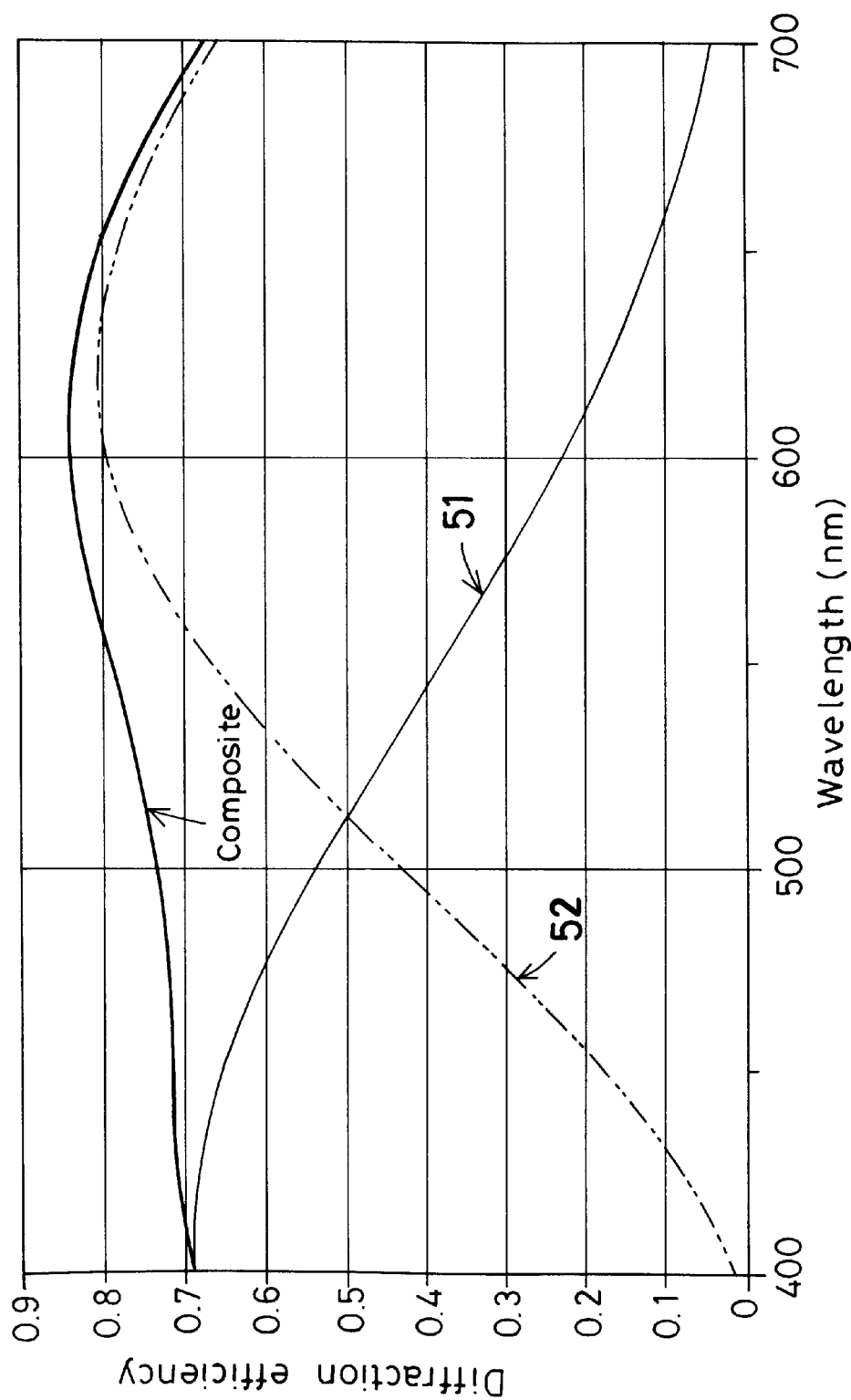
FIG. 9 is a graphical view that shows a diffraction efficiency distribution of another embodiment of the present invention with respect to wavelength.
Figure 10:
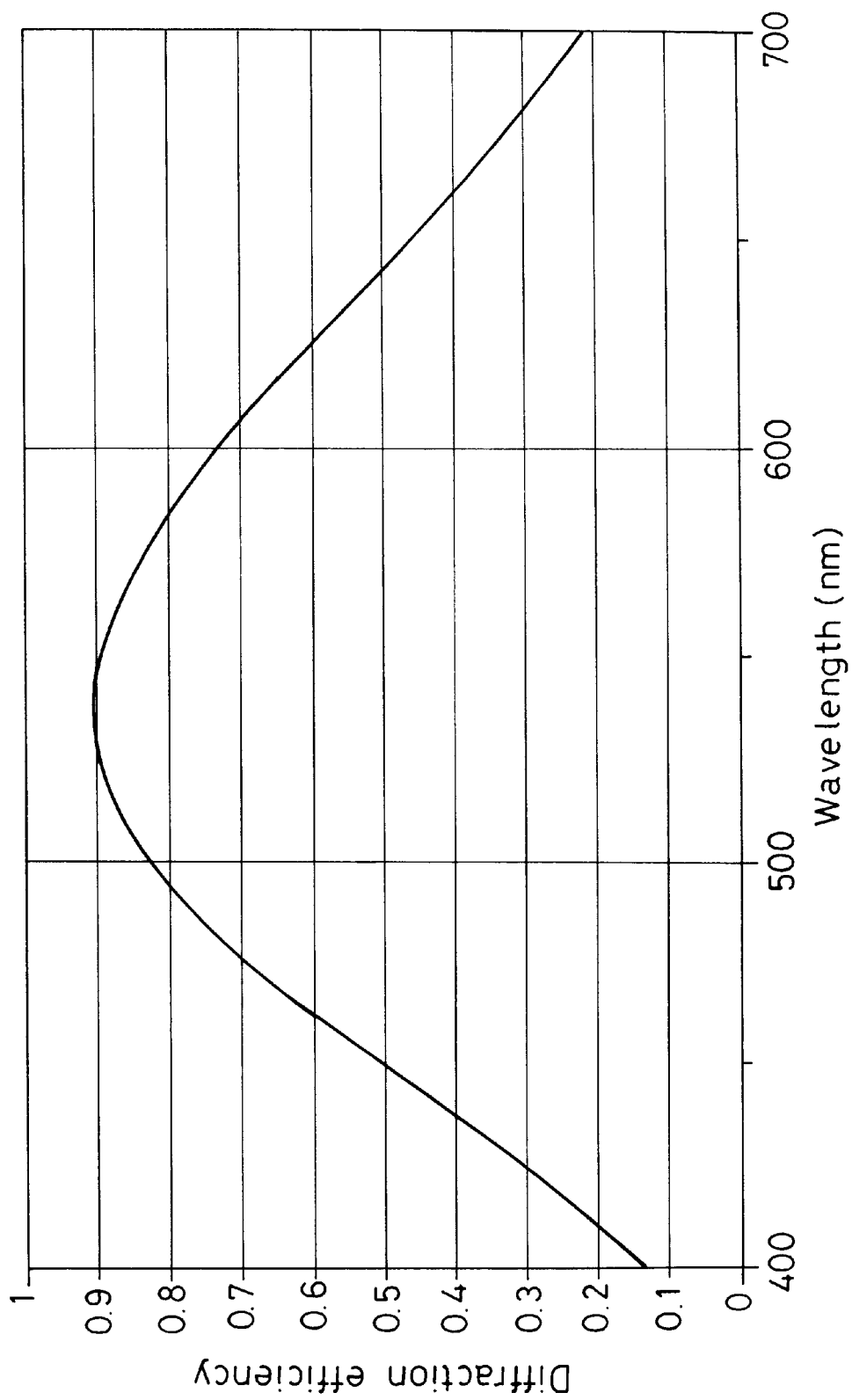
FIG. 10 is a graphical view that shows a diffraction efficiency distribution of what is recorded at a monochromatic wavelength for comparison with FIG. 9.

FIGS. 9 and 10 show another illustrative example and a comparative example, respectively. More specifically, wavelength-depending diffraction efficiency of the microhologram 5' (FIG. 11) consisting of a single hologram piece upon recorded at a refractive index modulation Δn=0.035 in a 6-μm thick photopolymer with the average refractive index being n=1.52, using monochromatic light of wavelength 514 nm, is shown in FIG. 10 for the purpose of comparison. Shown in FIG. 9 are diffraction efficiencies of the hologram pieces 51 and 52 upon recorded in the same photopolymer using wavelengths of 457 nm and 647 nm according to the present invention (the distribution of Δn is 0.015 for 457 nm and 0.02 for 647 nm), and composite diffraction efficiency of a hologram piece 51 and 52 combination.

From these examples it is seen that the hologram color filter of the present invention has a wider yet gentler diffraction efficiency distribution when compared with a prior art one consisting of a single hologram piece, and enables the three colors R, G and B to have approximately the same intensity so that a color balance can be corrected for color displays. It is also understood that the color balance can be placed under free control by changing the number of peak wavelengths (or hologram pieces), the combination of peak wavelengths, and the geometry of the diffraction efficiency distribution curve of each hologram piece. Therefore, when the color balance becomes unfavorable due to the geometry of an opening pattern of black matrices, a spectral pattern of the light source used, etc., it can be corrected.

While the hologram color filter according to the present invention have been explained with reference to its principles and examples, it is understood that the present invention is in no sense limited thereto, and so many modifications may be made without departing from the scope of the present invention. A liquid crystal display device with the present hologram color filter built in it may be used immediately as a direct-view type of liquid crystal display device. Alternatively, the present hologram color filter be used as a space modulation element for projection display devices to make up a liquid crystal projection display device.

Figure 12:
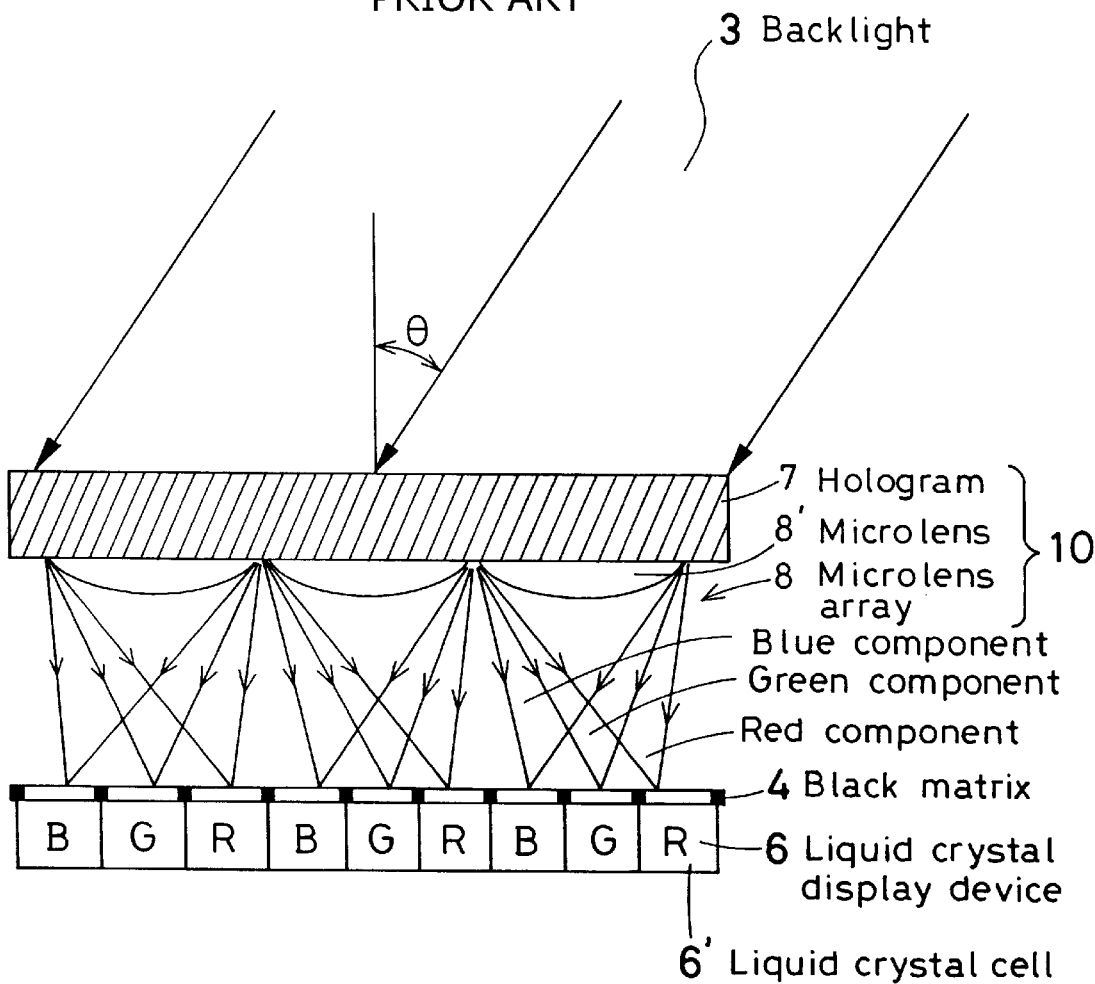
FIG. 12 is a sectional schematic of a liquid crystal display device making use of the second type of conventional hologram color filter.
Figure 13:
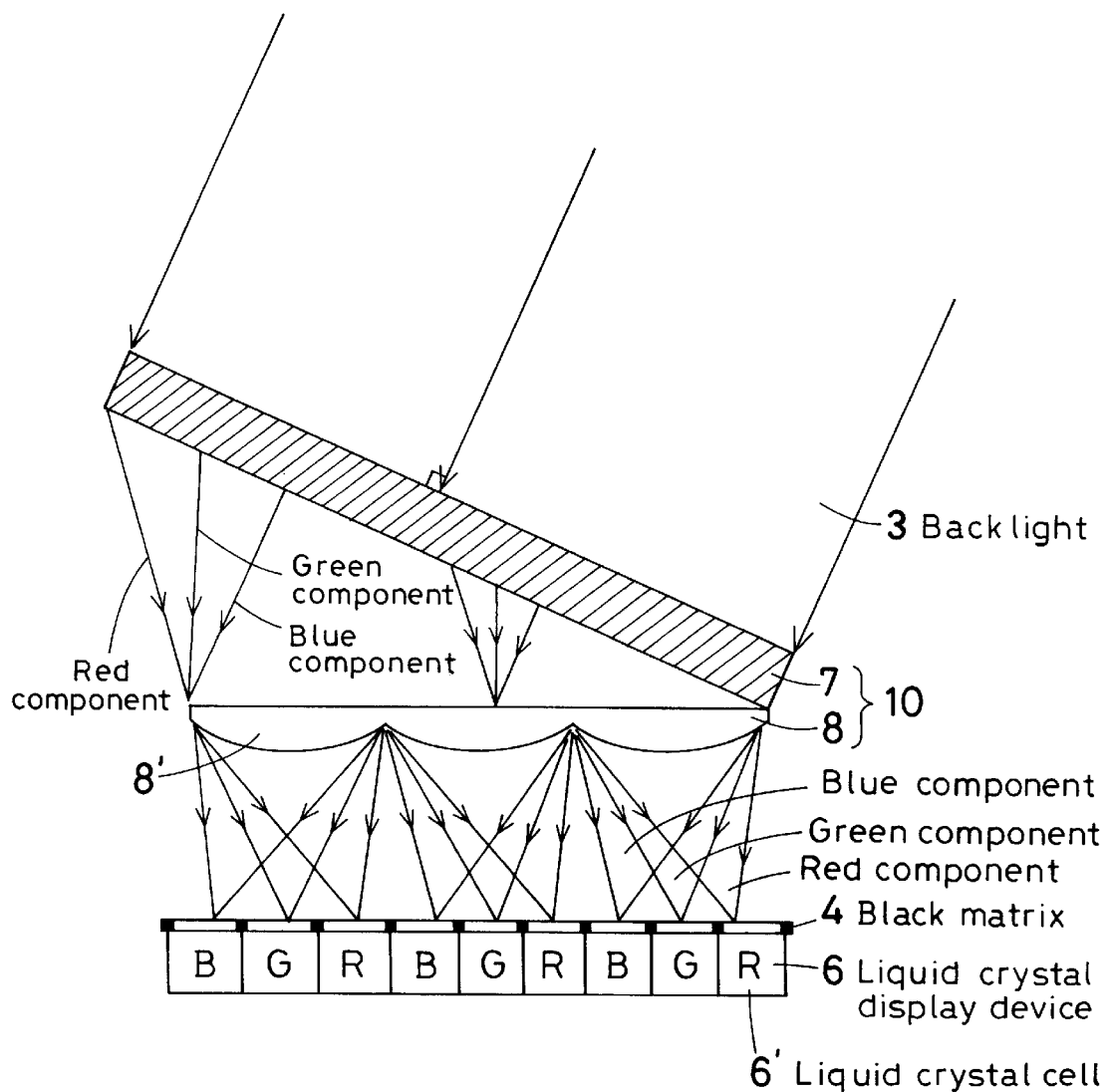
FIG. 13 is a sectional schematic of a liquid crystal display device making use of a modification of the hologram color filter shown in FIG. 12.
Figure 14:
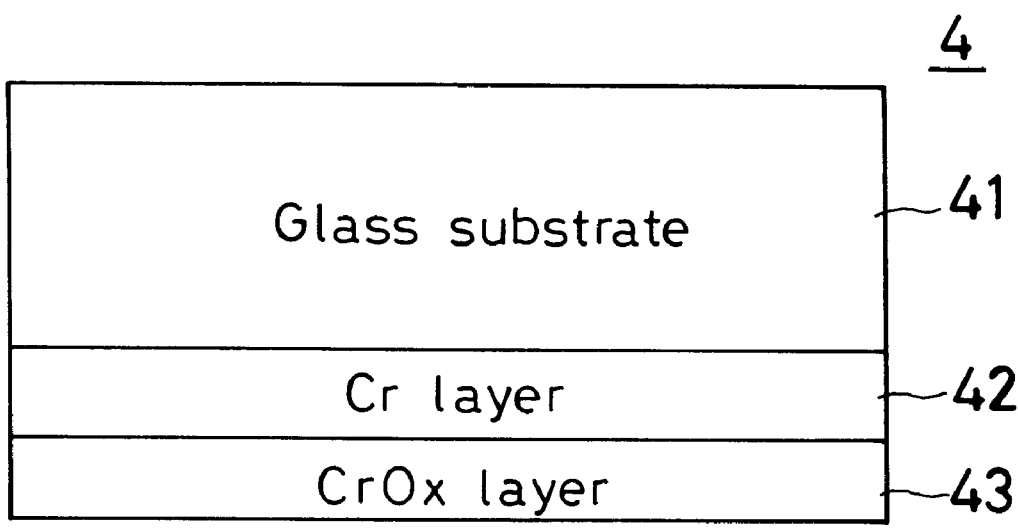
FIG. 14 is a schematic that illustrates the construction of one black matrix used in the present invention.

FIG. 14 is a schematic showing an exemplary black matrix used in the devices shown in FIGS. 11 to 13 according to the present invention.

Referring to FIG. 14, a chromium layer 42 and a chromium oxide (CrOx) layer 43 are stacked on a glass substrate 41 in the described order. The black matrix of such structure has a reflectance factor of 1 to 2% in sharp contrast to about 55% that is the reflectance factor of a conventional single layer form of chromium black matrix (an average value of light of 400 to 700 nm as calculated upon normal incidence). Consequently, distortion of the plane of polarization due to multiple reflection can be reduced as much as possible.

Figure 15:
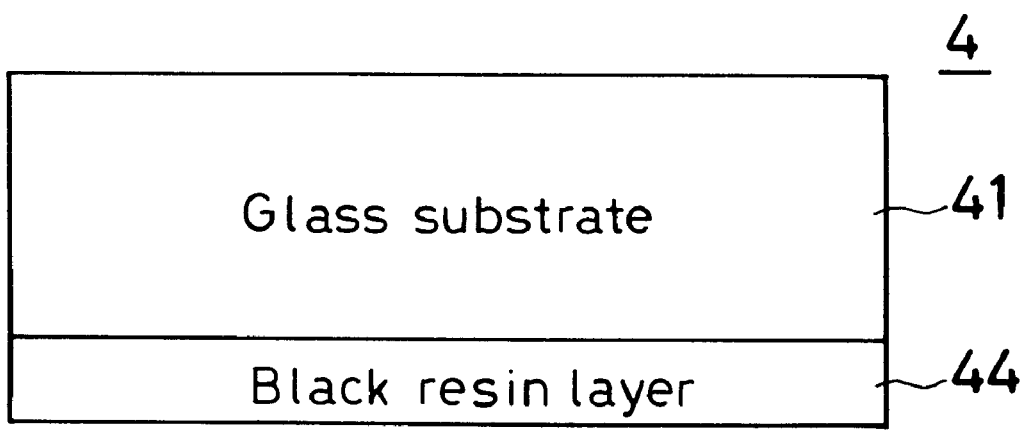
FIG. 15 is a schematic that illustrates the construction of another black matrix used in the present invention.

FIG. 15 is a schematic illustrating another example of the low-reflection black matrix used in the present invention.

As illustrated in FIG. 15, a black resin layer 44 is formed on a glass substrate 41, and has a reflectance factor of 1 to 2% as in the case of FIG. 14, so that distortion of the plane of polarization due to multiple reflection can be reduced as much as possible. For instance, when resin having black carbon dispersed therein is used for the black resin layer 44, some advantages are obtainable; the resultant black matrix has a reduced transmittance even at a small thickness, and is less dependent on wavelength. However, it is not suitable to provide this resin layer on a TFT array side because of its electric conductivity. In such a case, it is preferable to use black resin having a non-conductive organic pigment dispersed therein. By providing the black resin layer on the TFT array side it is also possible to achieve low reflection, and a vignetting factor improvement for low power consumption.

Preferably, a hologram color filter for liquid crystal display devices should have a contrast of at least 1,000. However, the contrast is lower than 1,000 at an interface reflection exceeding 4%. Thus, the black matrix used in the present invention should preferably have a reflectance factor of up to 4%.

Figure 16:
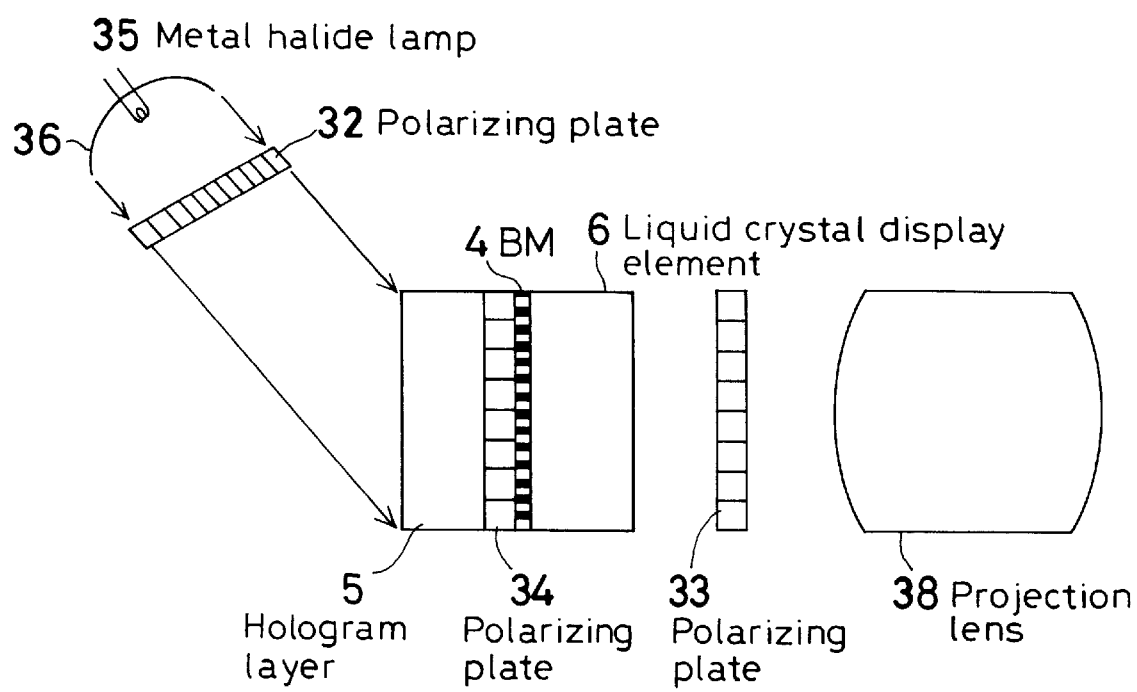
FIG. 16 is a schematic of one example where two polarizing plates are used on an incident side.

One example of a liquid crystal projection display device constructed using the hologram color filter of the present invention is illustrated in FIG. 16.

The device shown in FIG. 16 is characterized in that two polarizing plates are provided on an incidence side of a liquid crystal display element. As illustrated, a polarizing plate (or polarizer) 32 is located between a light source and a hologram layer 5, so that white backlight can be converted into linearly polarized light having a 45° plane of polarization, for instance. The polarized light is then allowed to be incident on the hologram layer 5 at a given angle for the purpose of spectroscopic separation. For this polarizing plate 32 which generates heat incidental to light absorption, a dye type of polarizing plate resistant to light and heat is used. Instead of the polarizing plate, use may be made of a polarizing prism by which incident light is separated into p-polarized light and s-polarized light. For the polarizing prism in this case, a Wollaston prism or the like may be used.

The light with the state of polarization somewhat disordered by the hologram layer 5 is then corrected by a polarizing plate (or polarizer) 34 for uniform polarization. In this case, both the polarizing plates 32 and 34 polarize light in the same direction. For the polarizing plate 34 which absorbs only a small quantity of light, an iodine type of polarizing plate which, albeit being less resistant to light and heat, has a high degree of polarization may be used. A color liquid crystal display element 6 is illuminated through openings in the black matrix 4 by the light with the state of polarization corrected as mentioned above, and a display image modulated by the color liquid crystal display element 6 is projected from a second polarizing plate through a projection lens 38 onto a screen (not illustrated).

With such an arrangement, barely about 8% of the incident light is absorbed in the polarizing plate 34; so the generation of heat can be reduced as much as possible. An iodine type of polarizing plate is higher in terms of the degree of polarization than a dye type of polarizing plate. In other words, the iodine type of polarizing plates can be located on both sides of the liquid crystal display element for cooperation with the low-reflection black matrix, thereby making remarkable improvements in contrast and, hence, image quality.

Examples of the alignment mark and alignment method according to the present invention will now be explained with reference to FIGS. 17 to 23 while the hologram color filter is referred to as an example.

Figure 17:
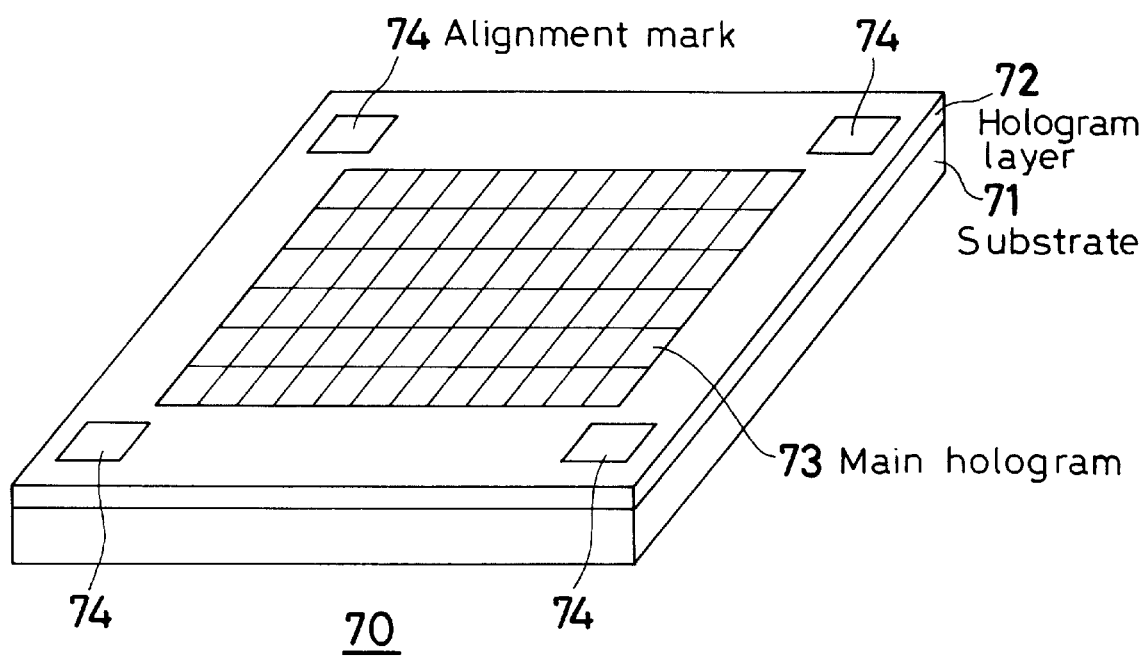
FIG. 17 is a perspective view of a hologram provided with alignment marks according to the present invention.

FIG. 17 is a perspective view of one exemplary hologram 70 to be aligned. The hologram 70 comprises a hologram layer 72 formed on a glass substrate 71. The hologram layer 72 has a main hologram 73 comprising a hologram array 5 at a substantially central region, and is provided at its four corners with alignment marks 74 in predetermined relation to the main hologram 73. The main hologram 73 and the alignment marks 74 are all comprised of a phase type of holograms, and usually transparent and so not visible to the eye.

Figure 18:
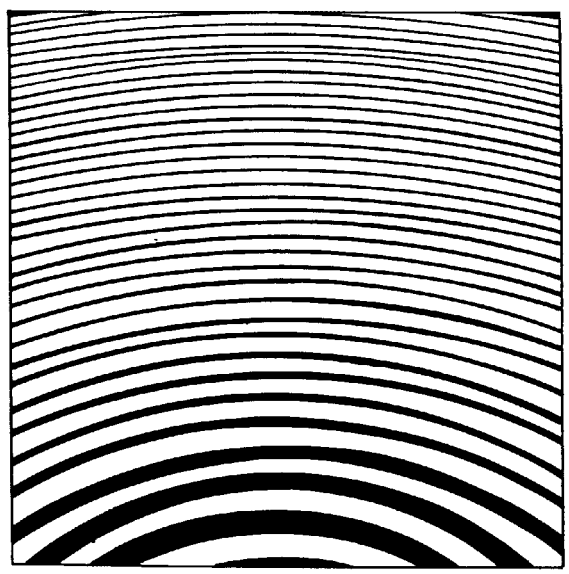
FIG. 18 is a schematic plan view of one exemplary alignment mark.

One exemplary alignment mark 74 is a phase Fresnel zone plate which, as is the case with the microhologram 5', converges obliquely incident parallel light as illustrated schematically in the plan view of FIG. 18. A phase diffraction grating having a constant grating pitch as illustrated schematically in the plan view of FIG. 19, too, is usable. In both FIGS. 18 and 19, black and white portions represent high and low index-of-refraction portions having a phase difference with respect to incident light, and vice versa. These alignment marks 74 are all comprised of phase gratings or phase interference fringes, and have the merit of being fabricated as is the case with, and at the same time as, the main hologram 73. When phase Fresnel zone plates as shown in FIG. 18 and having the same focal length as that of the microhologram 5' are used for the alignment marks 74 (see FIG. 22 to be referred to later), there is another merit that the alignment marks 74 can be fabricated using writing data partly or wholly identical with those for the main hologram 73.

Figure 20:
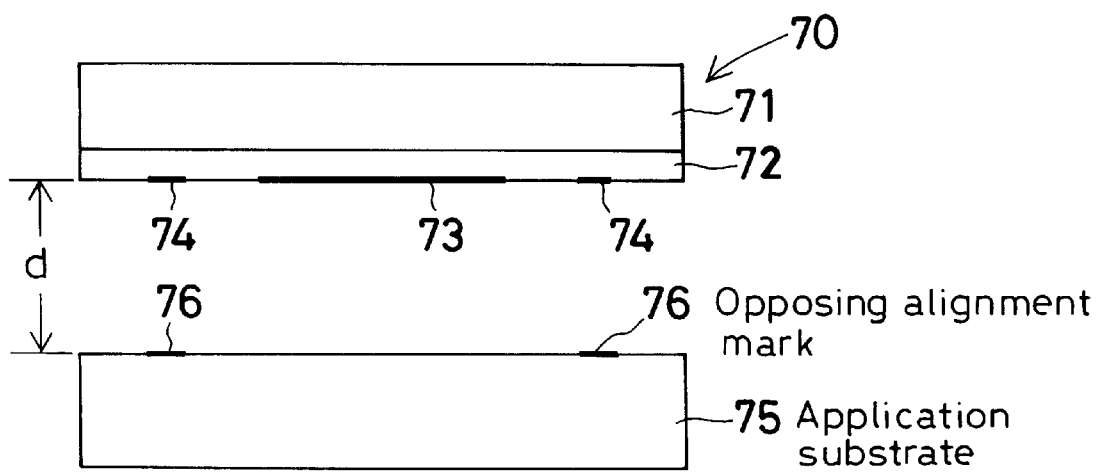
FIG. 20 is a schematic that illustrates a relative layout of a hologram and an application substrate.

To bring the hologram 70 having the alignment marks 74 on the periphery in precise alignment with an application substrate 75 such as the liquid crystal display element 6 (FIG. 11) having the black matrix 4 on the back side, the hologram 70 is spaced away from the application substrate 75 at a given interval d (corresponding approximately to the focal length of the microhologram 5' in the arrangement shown in FIG. 11), as shown in FIG. 20, so that alignment marks 74 provided on the hologram 70 are opposed to corresponding alignment marks 76 provided on the application substrate 75. For instance, when the application substrate 75 is the liquid crystal display element 6 having the black matrix 4, the opposing alignment marks 76 are each comprised of an opaque pattern defined as by metal or a mark having a contrast. As is the case with the alignment marks 74, the opposing alignment marks 76, too, may be each comprised of a phase pattern which is transparent and so not visible to the eye. When the hologram 70 is spaced away from the application substrate 75 at the given interval d, a transparent glass plate or other intermediate may be inserted between them.

Precise alignment of the hologram 70 with respect to the application substrate 75 using such alignment marks 74 and the opposing alignment marks 76 may be achieved by the following methods.

Figure 21:
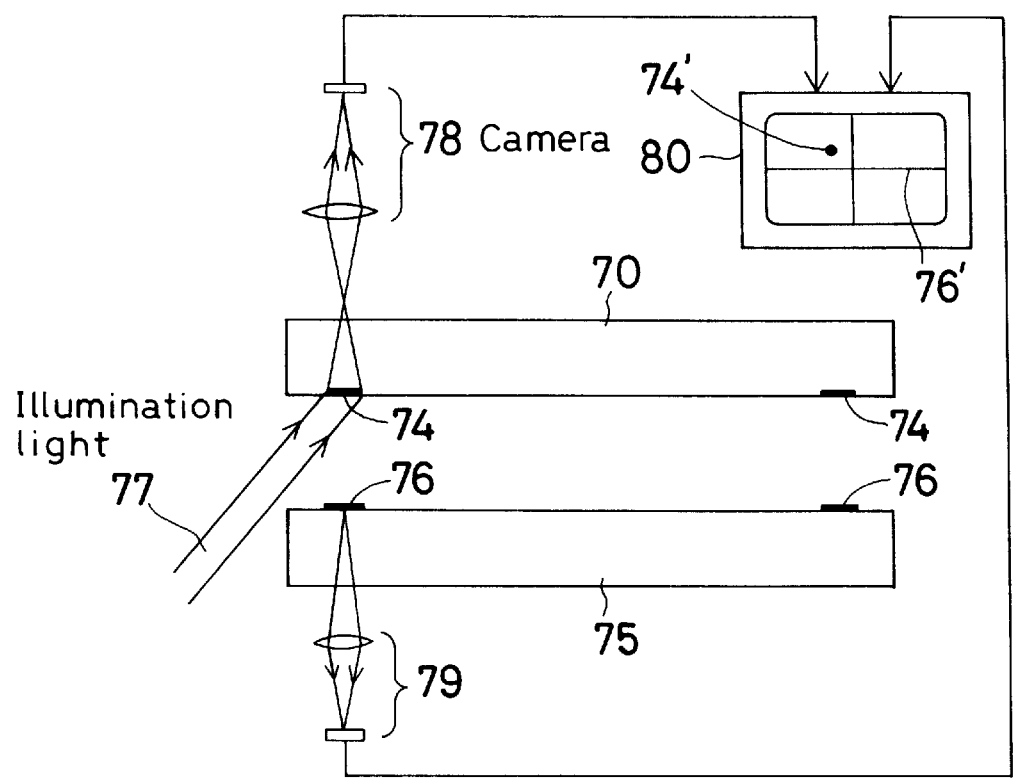
FIG. 21 is a schematic that illustrates one method of aligning a hologram and an application substrate.

Referring first to FIG. 21, phase Fresnel zone plates which, as shown in FIG. 18, converge obliquely incident illumination light 77 are used as alignment marks 74 to be provided on the periphery of a hologram 70. Upon the illumination light 77 of given wavelength incident at a predetermined angle on the side of the hologram 70 opposite to an application substrate 75, the light diffracted by the alignment mark 74 is once converged into an aerial point. The resultant image at this convergence point is taken by a camera 78 comprising an objective and an image-pickup element such as a CCD. On the other hand, the opposing alignment mark 76 on the application substrate 75 is appropriately illuminated to form an image, which is in turn taken by a camera 79 comprising an objective and an image-pickup element such as a CCD. The thus taken images are electronically synthesized for display on a monitor screen 80. An image 74' of the alignment mark 74 representing the position of the hologram 70 appears in the form of a blip on the monitor screen 80, while an image 76' of the opposing alignment mark 76 representing the position of the application substrate 75 is displayed as such in a pattern form. Thus, the hologram 70 and application substrate 75 can be kept in precise alignment by regulating both their relative positions such that the centers of the images 74' and 76' coincide with each other. While the alignment marks 74 used have been described as converging phase Fresnel zone plates, it is understood that divergent phase Fresnel zone plates acting much like negative lenses may also be used; however, in this case, the focal position of the camera 78 is brought in line with the divergent point of its virtual image. The alignment marks 74 used may be of a reflection type rather than of a transmission type; however, in this case, the direction of incidence of the illumination light 77 should be contrary to that illustrated.

Figure 22:
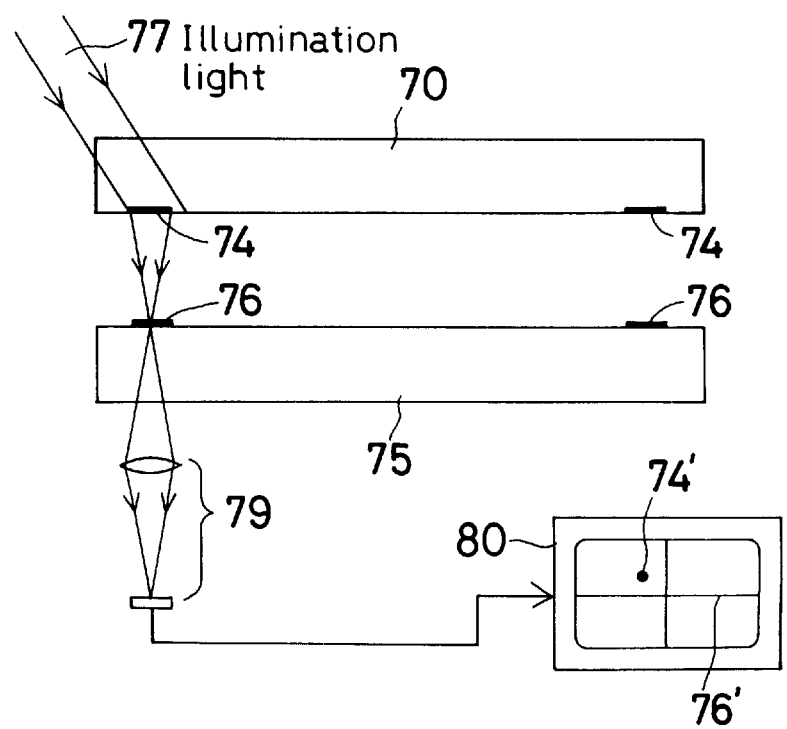
FIG. 22 is a schematic that illustrates another method of aligning a hologram and an application substrate.

Referring then to FIG. 22, phase Fresnel zone plates which, as shown in FIG. 18, converge obliquely incident illumination light 77 and have a focal length d are used as alignment marks 74 to be provided on the periphery of a hologram 70. This corresponds to the case where the same hologram as the microhologram 5' (FIG. 11) forming the main hologram 73 (FIG. 17) is used. Upon the illumination light 77 of given wavelength incident at a predetermined angle on the side of the hologram 70 that is not opposite to an application substrate 75, the light diffracted by an alignment mark 74 is converged onto an opposing alignment mark 76 on the application substrate 75. When the opposing alignment mark 76 of the application substrate 75 is approximately illuminated, an image of the area of the opposing alignment mark 76 is taken by a camera 79 comprising an objective and an image-pickup element such as a CCD, and is then displayed on a monitor screen 80. An image 74' of the alignment mark 74 representing the position of the hologram 70 appears in the form of a blip on the monitor screen 80, while an image 76' of the opposing alignment mark 76 representing the position of the application substrate 75 is displayed as such in a pattern form. Thus, the hologram 70 and application substrate 75 can be kept in precise alignment by regulating both their relative positions such that the centers of the images 74' and 76' coincide with each other.

Figure 19:
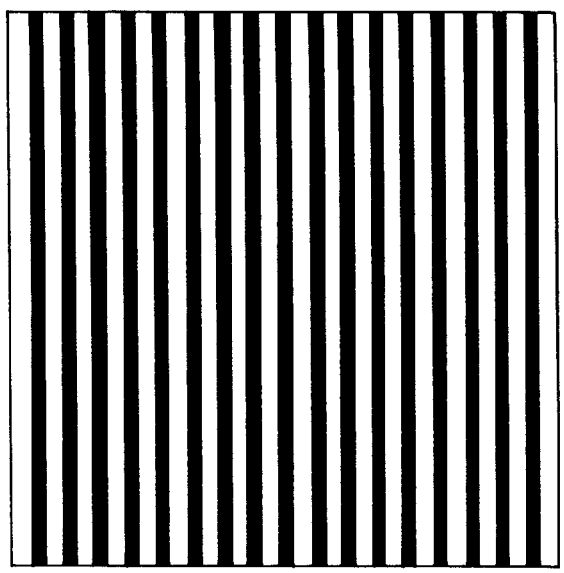
FIG. 19 is a schematic plan view of another exemplary alignment mark.
Figure 23:
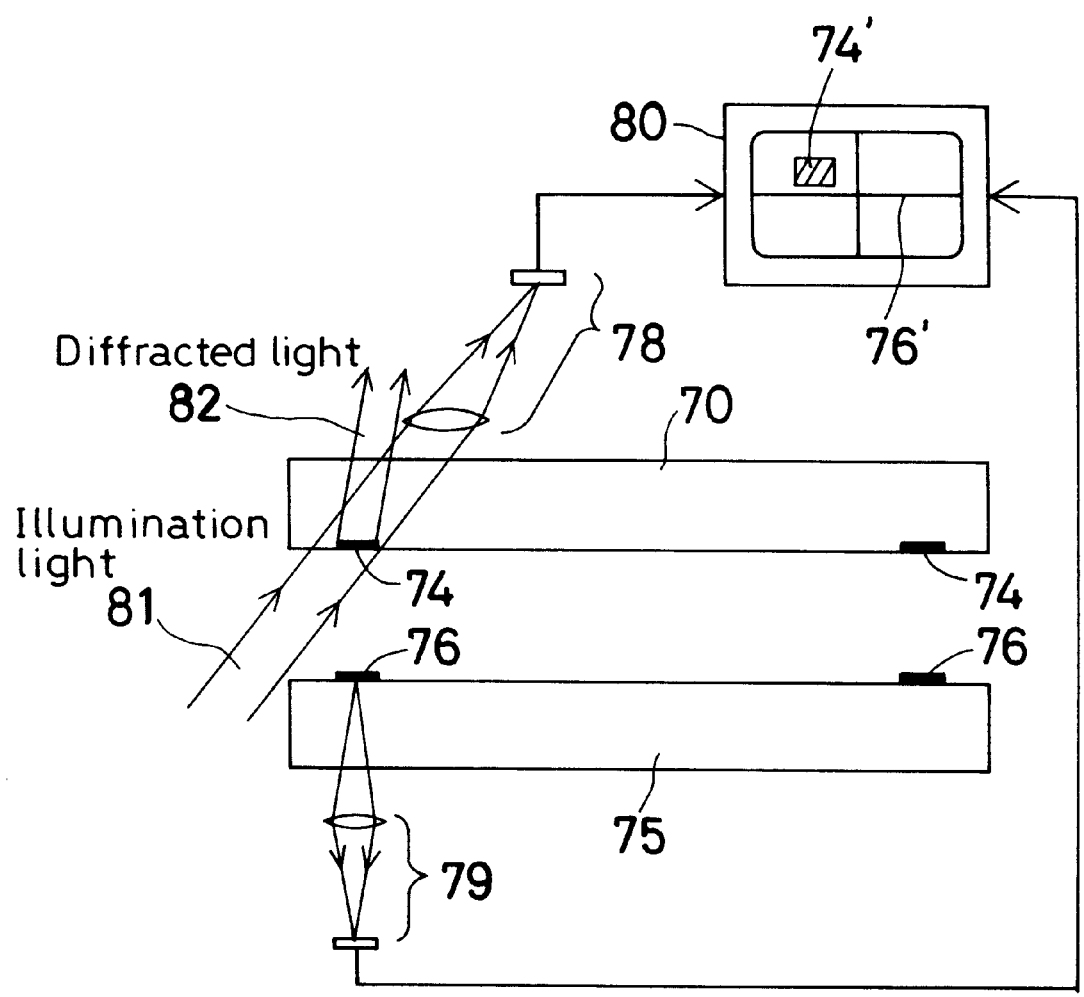
FIG. 23 is a schematic that illustrates still another method of aligning a hologram and an application substrate.

Referring further to FIG. 23, phase diffraction gratings which have a constant grating pitch, as shown in FIG. 19, are used as alignment marks 74. In this case, when the vicinity of the alignment mark 74 is illuminated by illumination light 81 containing a multiplicity of wavelengths from the side of a hologram 70 which faces an application substrate 75, a part of the light is converged by the alignment mark 74 into diffracted light 82, so that a rectilinearly propagating component is reduced. In an image 74' of the vicinity of the alignment mark 74 upon taken by a camera 78 using this rectilinearly propagating component, therefore, the diffraction grating area is darker than the circumference of the alignment mark that is outside the alignment mark recorded area. In an image 74' of the vicinity of the alignment mark 74 upon taken by the camera 78 using the diffracted light 82, to the contrary, the diffraction grating area is brighter than the rest. On the other hand, the opposite alignment mark 76 on the application substrate 75 is appropriately illuminated to form an image, which is in turn taken by a camera 79, as in the case of FIG. 21. Both the thus taken images are then electronically synthesized for display on a monitor screen 80. In the displayed image 74' of the alignment mark 74 representing the position of the hologram 70, the diffraction grating area is either darker or brighter than the rest. The image 76' of the opposing alignment mark 76 representing the position of the application substrate 75, on the other hand, is displayed as such in a pattern form. Thus, the hologram 70 and application substrate 75 are kept in precise alignment by regulating both their relative positions such that the centers of the images 74' and 76' coincide with each other. It is here to be noted that the same also holds for when the illumination light 81 is allowed to be incident from the side of the hologram 70 which does not face the application substrate 75.

In the foregoing explanations made with reference to FIGS. 21 to 23, the opposing alignment marks 76 have been assumed to comprise opaque patterns defined as by metal; however, it is understood that even when they comprise transparent phase patterns as in the case of the alignment marks 74, it is possible to obtain images representing their positions. In the alignment arrangements shown in FIGS. 21 to 23, it is desired to carry out alignment operations while plural, not one, alignment marks are simultaneously observed.

If the alignment marks 74 comprising such phase gratings or phase interference fringes as mentioned above are located on the main hologram 73 in predetermined relation thereto and positions thereof are made visible in a similar manner as mentioned above, it is then possible to cut or otherwise machine the hologram 73 on the basis of the thus detected position data, rather than to bring the hologram 73 in alignment with other substrate on the basis of the thus detected positions.

In the foregoing explanations, such a hologram color filter as shown in FIG. 11 has been assumed to be used as the main hologram 73. However, this is nothing else than one exemplary premise. It would become apparent to those skilled in the art that the present invention is never limited thereto; so it may be applicable to alignment, positioning, and location of other various phase holograms and phase diffraction gratings, to say nothing of hologram lens arrays.

According to the present invention, the converging element holograms forming the hologram color filter or the hologram comprising parallel and uniform interference fringes are each constructed from two hologram pieces superposed on each other or multi-recorded therein, which, with respect to white light incident at a given angle, have substantially identical spatial wavelength distributions of wavelength dispersion and different peak wavelengths of diffraction efficiency, as can be seen from the foregoing explanations. The composite diffraction efficiency distribution given by the two hologram pieces can be made wider and gentler than would be possible with a single hologram, so that a satisfactory color balance is achievable. It is also possible to place the color balance under free control, when it becomes unfavorable due to the geometry of an opening pattern between black matrices, a spectral distribution of the light source, etc., so that the color balance can be corrected with simple arrangements to thereby achieve the optimum color reproduction.

The alignment mark according to the present invention can be fabricated simultaneously with the fabrication of a main hologram or diffraction grating, because the alignment mark, which comprises interference fringes or a diffraction grating, is designed to be provided on the same substrate as that for a hologram or diffraction grating. By use of the alignment method according to the present invention it is also possible to achieve precise alignment because the alignment mark usually not visible to the eye can be made easily visible.

What we claim is:

1. A hologram color filter comprising an array of converging element holograms, each of which enables white light incident at a given angle with respect to a normal line of a hologram recorded surface thereof to be spectroscopically separated by wavelength dispersion characterized in that:

said converging element holograms each have two hologram pieces superposed on each other or multi-recorded therein, which, with respect to said white light incident at a given angle, have substantially identical spatial wave-length distributions of wavelength dispersion and different peak wavelengths of diffraction efficiency.

2. The hologram color filter according to claim 1, characterized in that said superposed or multi-recorded hologram pieces have substantially identical convergence distances at peak wavelengths of diffraction efficiency thereof.

3. The hologram color filter according to claim 1 or 2, characterized in that the spatial wavelength distributions of said superposed or multi-recorded hologram pieces are shifted to each other by an angle of at least 1° between principal rays of central wavelength.

4. The hologram color filter according to claim 1 or 2, characterized in that it is used in a color liquid crystal display device having black matrices located between pixels.

5. A method of fabricating a hologram color filter comprising an array of converging element holograms, each of which enables white light incident at a given angle with respect to a normal line of a hologram recorded surface thereof to be spectroscopically separated by wavelength dispersion in a direction substantially along the hologram recorded surface, wherein said converging element holograms have each a plurality of hologram pieces superposed on each other or multi-recorded therein, which, with respect to said white light incident at a given angle, have substantially identical spatial wavelength distributions of wavelength dispersion and different peak wavelengths of diffraction efficiency, characterized in that:

reference light having the same wavelength as one of said peak wavelengths and incident at the same angle of incidence as that of white light for reconstruction and object light converging toward a point at which light of that wavelength is to converge during reconstruction are permitted to be concurrently incident on a hologram photosensitive material to record a first hologram piece therein, and simultaneously with or subsequently to this, a second hologram piece is recorded in the hologram photosensitive material using light of the same wavelength as another peak wavelength, similar recording operation being repeated plural times.

6. The method of fabricating a hologram color filter according to claim 5, characterized in that said object light at each peak wavelength is generated in the form of diffracted light obtained by permitting reconstruction illumination light to be incident at the same angle of incidence as white light for reconstruction on an identical computer generated hologram and diffracting said reconstruction illumination light by said computer generated hologram, and said reference light at each peak wavelength is generated in the form of rectilinearly propagating light of said reconstruction illumination light through said computer generated hologram.

7. The method of fabricating a hologram color filter according to claim 6, characterized in that an array of holograms each having a plurality of the fabricated hologram pieces superposed on each other or multi-recorded therein is used in place of said computer generated hologram to generate object light and reference light in similar manners, whereby similar recording operation is repeated plural times.

8. A method of fabricating a hologram color filter comprising an array of converging element holograms, each of which enables white light incident at a given angle with respect to a normal line of a hologram recorded surface thereof to be spectroscopically separated by wavelength dispersion in a direction substantially along the hologram recorded surface, wherein said converging element holograms have each a plurality of hologram pieces superposed on each other or multi-recorded therein, which, with respect to said white light incident at a given angle, have substantially identical spatial wavelength distributions of wavelength dispersion and different peak wavelengths of diffraction efficiency, characterized in that:

reference light having a given wavelength and incident at a first angle different from an angle of incidence of white light for reconstruction and object light converging toward a point at which light of that wavelength is to converge during reconstruction are permitted to be concurrently incident on a hologram photosensitive material to record a first hologram piece therein, and simultaneously with or subsequently to this, reference light having said given wavelength and incident at a second angle different from the angle of incidence of white light for reconstruction and said first angle and object light converging toward a point at which light of that wavelength is to converge during reconstruction are permitted to be concurrently incident on the hologram photosensitive material to record a second hologram piece therein, similar recording operation being repeated plural times.

9. A method of fabricating a hologram color filter comprising an array of converging element holograms, each of which enables white light incident at a given angle with respect to a normal line of a hologram recorded surface thereof to be spectroscopically separated by wavelength dispersion in a direction substantially along the hologram recorded surface, wherein said converging element holograms have each a plurality of hologram pieces superposed on each other or multi-recorded therein, which, with respect to said white light incident at a given angle, have substantially identical spatial wavelength distributions of wavelength dispersion and different peak wavelengths of diffraction efficiency, characterized in that:

reference light having a first wavelength and incident at a first angle different from an angle of incidence of white light for reconstruction and object light converging toward a point at which light of that wavelength is to converge during reconstruction are permitted to be concurrently incident on a hologram photosensitive material to record a first hologram piece therein, and simultaneously with or subsequently to this, reference light having a second wavelength and incident at a second angle different from the angle of incidence of white light for reconstruction and said first angle and object light converging toward a point at which light of that wavelength is to converge during reconstruction are permitted to be concurrently incident on the hologram photosensitive material to record a second hologram piece therein, similar recording operation being repeated plural times.

10. The hologram color filter according to claim 1, characterized in that the spatial wavelength distributions of said superposed of multi-recorded hologram pieces are shifted to each other by an angle of at least 1° between principal rays of central wavelength, and characterized in that said hologram color filter is used in a color liquid crystal display device having black matrices located between pixels.

11. The hologram color filter according to claim 1, wherein one of said superposed or multi-recorded hologram pieces has a peak wavelength of diffraction efficiency at the color red and the other of said superposed or multi-recorded hologram pieces has a peak wavelength of diffraction efficiency at the color blue.

* * * * *